United States Patent
Divon et al.

(10) Patent No.: US 6,301,513 B1
(45) Date of Patent: Oct. 9, 2001

(54) VOCAL INFORMATION SYSTEM

(75) Inventors: Ayner Divon, Rosh Ha'Ayin; Asaf Mohr, Givat Shmuel, both of (IL)

(73) Assignee: Voquette Network Ltd., Ra' Anana (IL)

( * ) Notice: Subject to any disclaimer, the term of this patent is extended or adjusted under 35 U.S.C. 154(b) by 88 days.

(21) Appl. No.: 08/651,517

(22) Filed: May 22, 1996

(30) Foreign Application Priority Data

| May 25, 1995 | (IL) | 113843 |
| Oct. 29, 1995 | (IL) | 115805 |
| May 12, 1996 | (IL) | 118230 |

(51) Int. Cl.[7] .............. G06F 17/00; H04B 1/20

(52) U.S. Cl. ..................... 700/94; 369/2

(58) Field of Search ............... 381/300, 332, 381/302, 305, 334, 389; 340/825.25, 825.22; 364/400.01; 455/346, 345, 344, 348, 349; 369/2, 10, 69, 70; 700/94; 710/13, 62, 1

(56) References Cited

U.S. PATENT DOCUMENTS

| D. 368,911 | 4/1996 | Lam . | |
| 3,763,330 | 10/1973 | Fulwiler | 179/100.2 |
| 4,266,243 | 5/1981 | Shutterly | 358/121 |
| 4,393,277 | 7/1983 | Besen et al. | 179/2 |
| 4,455,651 | 6/1984 | Baran | 370/104 |
| 4,473,824 | 9/1984 | Claytor | 340/825.27 |
| 4,499,568 | 2/1985 | Gremillet | 369/30 |
| 4,614,144 | * 9/1986 | Sagara et al. | 340/825.25 |

(List continued on next page.)

FOREIGN PATENT DOCUMENTS

| 4 207 477 | 9/1993 | (DE) . |
| 0 128 093 | 12/1984 | (EP) . |
| 2 651 352 | 3/1991 | (FR) . |
| WO87/04309 | 7/1987 | (WO) . |

OTHER PUBLICATIONS

Deloddere et al., *Interactive Video On Demand*, IEEE 82–88 (May 1994).

Jones,*Baseband and Passband Transport Systems for Interactive Video Services*, IEEE 90–101 (May 1994).

Popular Mechanic, Feb. 1995.

*Primary Examiner*—Vivian Chang
*Assistant Examiner*—Xu Mei
(74) *Attorney, Agent, or Firm*—Darby & Darby

(57) ABSTRACT

A vocal information system with the capability of retrieving and playing digital and audio data together with an audio system and associated cassette is disclosed. The audio system includes a housing, a communication bus, a bus connector, a radio receiver and a sound player. The housing has a slot for receiving a removable digital unit. The connector connects to the bus and to the removable digital unit and the sound player is selectably connected to the outputs of the radio receiver and the removable digital unit. Furthermore, the removable digital unit includes a digital storage unit for storing data thereon, a digital interface which communicates with an external digital processor and with the digital storage unit and a digital vocalizer at least for converting data stored on the digital storage unit to audio signals. The removable digital unit can be formed as part of a cassette, such as a cassette for a tape deck, or as part of a PCMCIA card.

In a second embodiment, the audio system includes a radio receiver, a digital storage unit, a command input unit for receiving listener commands, a digital vocalizer and a sound player. The vocalizer converts data stored on the digital storage unit to audio signals and enables the listener to browse through and mark data stored in the digital storage unit. The sound player is selectably connected to the outputs of the radio receiver and the digital vocalizer.

1 Claim, 30 Drawing Sheets

U.S. PATENT DOCUMENTS

| | | | |
|---|---|---|---|
| 4,682,368 | 7/1987 | Takahashi | 455/38 |
| 4,698,776 | 10/1987 | Shibata | 364/513.5 |
| 4,725,977 | 2/1988 | Izumi et al. | 364/900 |
| 4,734,897 | 3/1988 | Schotz . | |
| 4,772,873 | 9/1988 | Duncan | 341/110 |
| 4,788,543 | 11/1988 | Rubin | 340/825.44 |
| 4,788,675 | 11/1988 | Jones et al. | 370/69.1 |
| 4,799,144 | 1/1989 | Parruck et al . | |
| 4,851,931 | 7/1989 | Parker et al. | 360/15 |
| 4,949,187 | 8/1990 | Cohen | 358/335 |
| 4,989,179 | 1/1991 | Simko | 365/45 |
| 5,042,070 | 8/1991 | Linna et al. | 381/59 |
| 5,055,947 | 10/1991 | Satoh . | |
| 5,056,145 | 10/1991 | Yamamoto et al. . | |
| 5,065,258 | 11/1991 | Warren et al. | 360/15 |
| 5,073,978 | 12/1991 | Mastrippolito . | |
| 5,099,422 | 3/1992 | Foresman et al. | 364/401 |
| 5,132,992 | 7/1992 | Yurt et al. | 375/122 |
| 5,159,182 | 10/1992 | Eisele . | |
| 5,172,413 | 12/1992 | Bradley et al. | 380/20 |
| 5,181,107 | 1/1993 | Rhoades | 358/86 |
| 5,191,410 | 3/1993 | McCalley et al. | 358/86 |
| 5,191,573 | 3/1993 | Hair | 369/84 |
| 5,193,141 | 3/1993 | Zwern . | |
| 5,206,641 | 4/1993 | Grant et al. . | |
| 5,210,611 | 5/1993 | Yee et al. | 358/191.1 |
| 5,220,611 | 6/1993 | Nakamura et al. . | |
| 5,247,347 | 9/1993 | Litteral et al. | 358/85 |
| 5,250,940 | 10/1993 | Valentaten et al. . | |
| 5,251,909 | 10/1993 | Reed et al. | 273/439 |
| 5,253,275 | 10/1993 | Yurt et al. | 375/122 |
| 5,263,199 | 11/1993 | Barnes et al. . | |
| 5,274,738 | 12/1993 | Daly et al. . | |
| 5,297,231 | 3/1994 | Miller . | |
| 5,303,093 | 4/1994 | Kawasaki . | |
| 5,307,326 | 4/1994 | Osawa . | |
| 5,311,423 | 5/1994 | Clark | 364/401 |
| 5,359,698 | 10/1994 | Goldberg et al. | 395/2.1 |
| 5,371,532 | 12/1994 | Gelman et al. | 348/7 |
| 5,383,112 | 1/1995 | Clark | 364/401 |
| 5,420,690 | 5/1995 | Koishi | 358/342 |
| 5,440,336 | 8/1995 | Buhro et al. | 348/13 |
| 5,477,511 | 12/1995 | Englehardt . | |
| 5,491,774 | 2/1996 | Norris | 395/2.79 |
| 5,511,000 | 4/1996 | Kaloi et al. | 364/514 |
| 5,524,051 | 6/1996 | Ryan . | |
| 5,541,638 | 7/1996 | Story | 348/7 |
| 5,550,863 | 8/1996 | Yurt et al. | 375/240 |
| 5,557,541 | 9/1996 | Schulhof et al. | 364/514 |
| 5,572,442 | 11/1996 | Schulhof et al. | 364/514 |
| 5,590,195 | 12/1996 | Ryan | 380/9 |
| 5,592,511 | 1/1997 | Schoen et al. | 375/220 |
| 5,654,942 | * 8/1997 | Akahane | 369/2 |
| 5,696,496 | * 12/1997 | Kumar | 340/825.25 |
| 5,790,423 | 8/1998 | Lau et al. . | |
| 6,061,306 | * 5/2000 | Budrheim | 369/2 |

\* cited by examiner

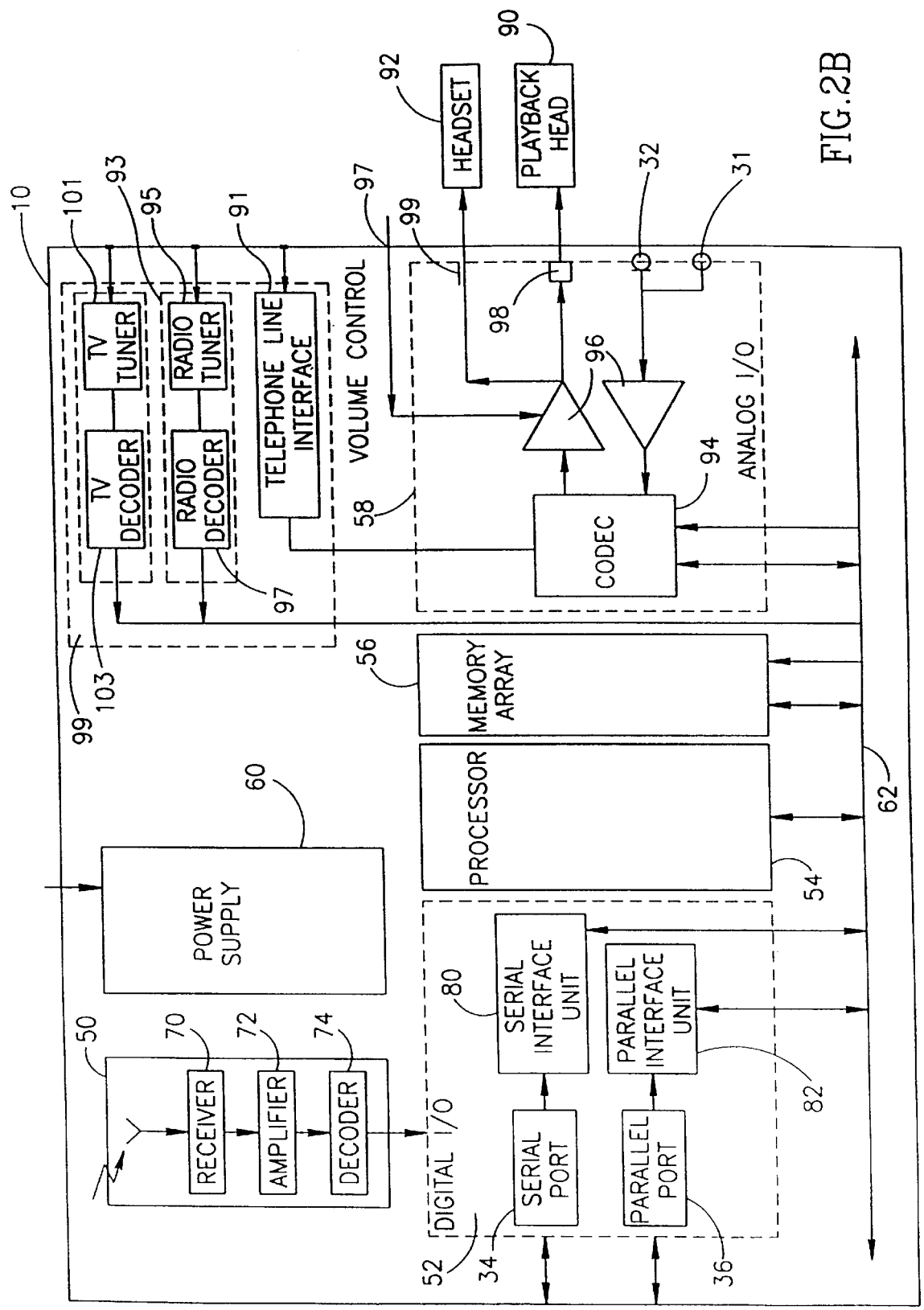

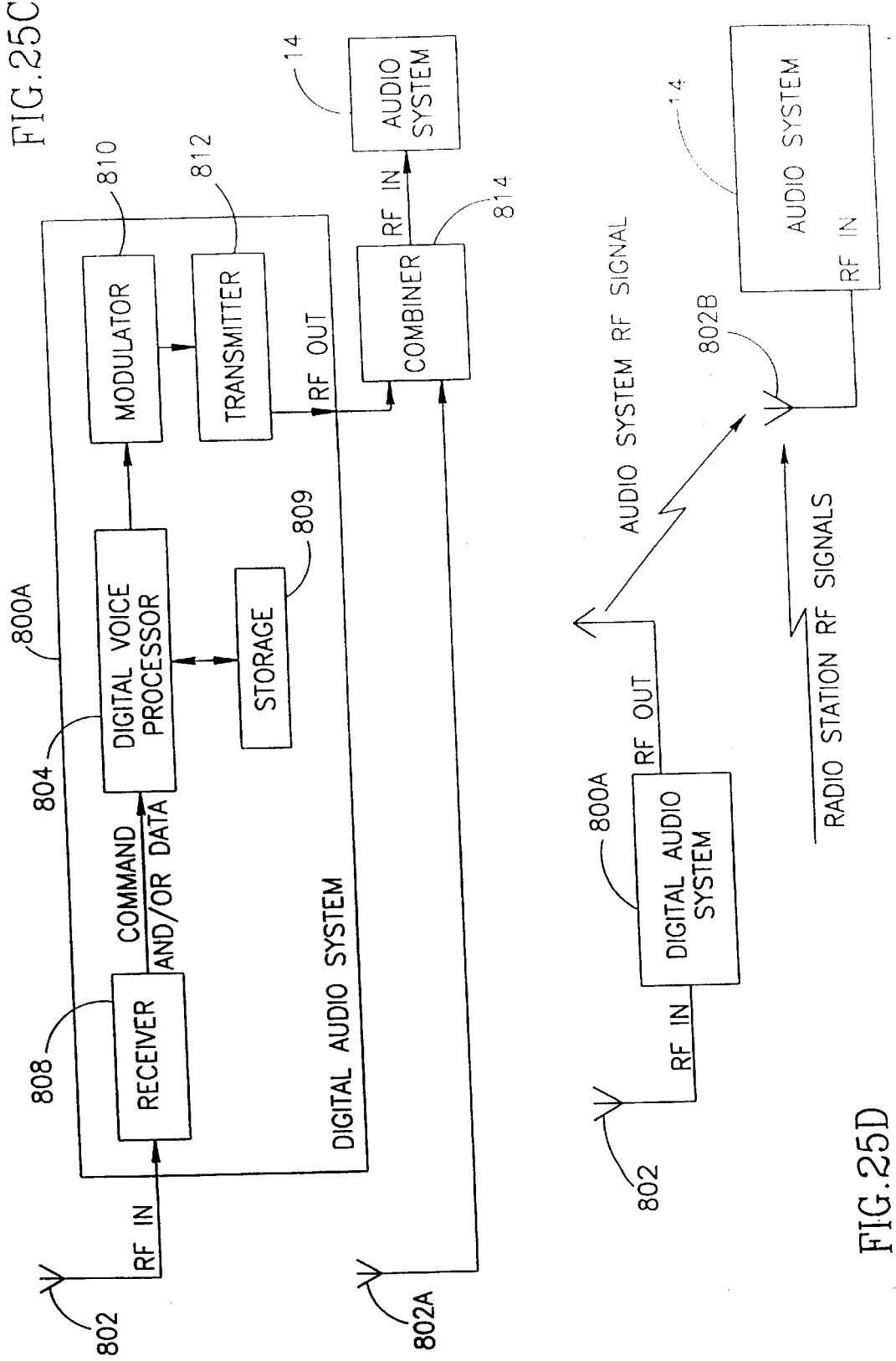

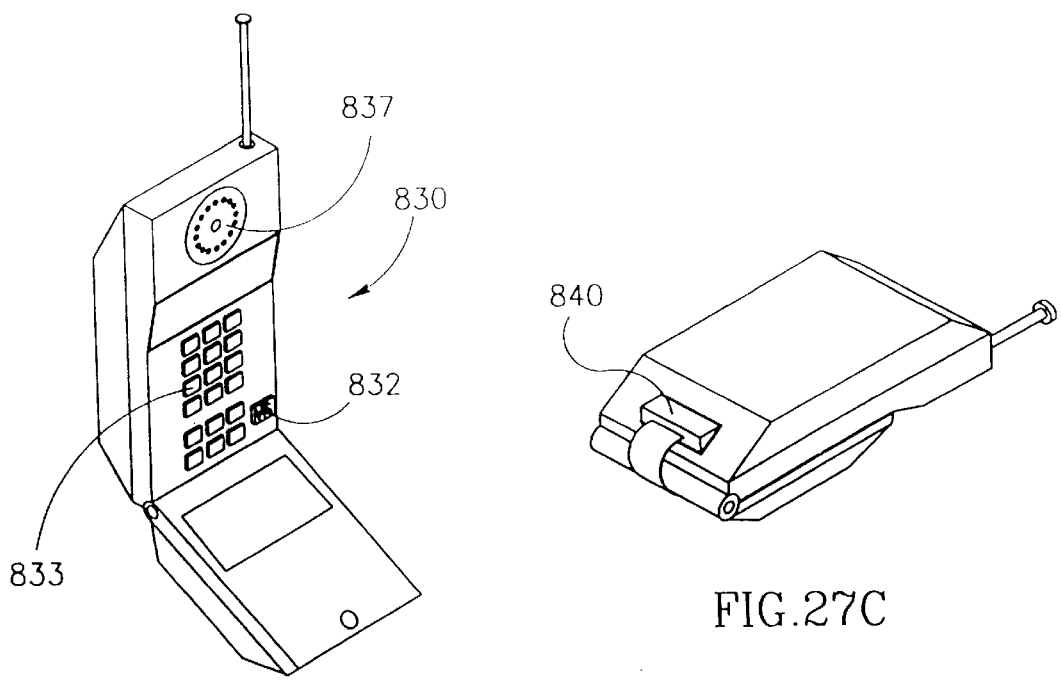
FIG.27A
FIG.27C
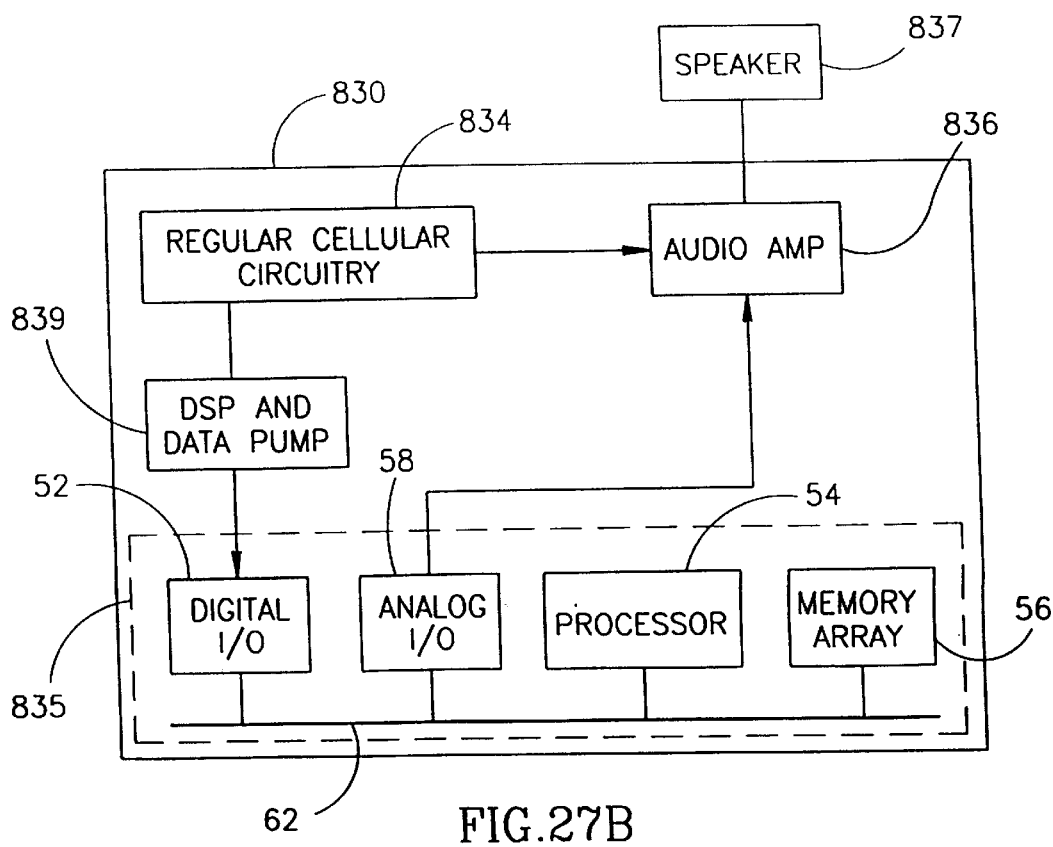
FIG.27B

VOCAL INFORMATION SYSTEM

FIELD OF THE INVENTION

The present invention relates to audio systems generally and to such systems which play digital audio data.

BACKGROUND OF THE INVENTION

Audio systems, such as stereos, are well known and can be found in practically every home and car. They come with many features, the most popular of which is the cassette-tape playback deck which plays audio signals stored on a magnetic tape within a cassette. The playback deck receives the cassette, reproduces the signals that were recorded on the magnetic tape within the cassette, and converts the stored signals to audible sounds.

Many audio systems also have a connection to a compact-disc player which reads digital data stored on a compact-disc and converts the digital data to audio signals. The audio signals are then provided to the sound system of the audio system to be played to the listener.

For those audio systems which do not have such a built-in connection, U.S. Pat. Nos. 4,734,897 and 5,307,326 describe an adapter which will convert the output of a compact-disc player into one which can be read by a playback deck. The adapter includes a housing in the shape of a cassette but which does not contain a magnetic tape therein. Instead, it contains an audio record head which transfers audio signals to the playback head of the playback deck. The playback deck then processes the audio signals as if they were picked up from a magnetic tape.

Other stereo-like vehicle accessories are described in U.S. Pat. Nos. 5,206,641, 5,263,199 and 5,193,141.

SUMMARY OF THE PRESENT INVENTION

It is an object of the present invention to provide an audio system, such as a vehicle stereo, with the capability to play digital audio data and which can be removed from the audio system. It is a further object of the present invention to provide a "diskette-cassette" which has digital audio data stored therein and which can be played by the playback deck of the tape deck of the audio system. The data stored in the diskette-cassette can be rewritten as often as desired and can be read and written by an external processor such as a personal computer. The diskette-cassette can access the data stored therein in any random order and can also mark the data in response to a listener's indication to do so.

Data can alternatively be loaded to the diskette-cassette through a telephone, radio receiver, television, etc., directly or indirectly through a receiving unit. The data can be text, digitized audio data, digitized speech data, compressed digitized audio or compressed digitized speech. Furthermore, the diskette-cassette can include a text-to-speech generator for converting the text data to audio signals and/or a decompressor for decompressing the compressed data.

It is a yet further object of the present invention to provide a vocal information system with the capability of retrieving and playing digital and audio data.

In accordance with a preferred embodiment of the present invention, the diskette-cassette includes a housing with holes to receive the rotating elements of a magnetic tape deck, a digital storage unit located within the housing and electronic elements located within the housing and connected to the digital storage unit. The digital storage unit stores therein digital data and the electronic elements at least convert the digital data to audio signals which the magnetic tape deck can pick up.

Alternatively, in accordance with a second preferred embodiment of the present invention, the functionality of the diskette-cassette can be implemented in a cartridge for placing into a slot of an audio system. The cartridge is in the form of a personal computer memory card industry association (PCMCIA) module and has a PCMCIA connector at one end thereof. The remaining elements are similar to those of the diskette-cassette.

Both embodiments can preferably include a command input unit and a processor. The processor communicates at least with the digital storage unit, selects portions of the digital data to be provided to the audio interface in accordance with listener commands from the command input unit, marks those portions of the digital data which the listener indicates as being of interest and selects the marked portions of the digital data to be provided to the digital interface to be received by an external digital processing unit.

As mentioned, the present invention also incorporates an audio system. In one embodiment, the audio system includes a housing, a communication bus, a bus connector, a radio receiver and a sound player. The housing has a slot for receiving a removable digital unit. The connector connects to the bus and to the removable digital unit and the sound player is selectably connected to the outputs of the radio receiver and the removable digital unit.

Preferably, the connector is a PCMCIA connector and the digital unit is formed on a PCMCIA module. Furthermore, the removable digital unit includes a digital storage unit for storing data thereon, a digital interface which communicates with an external digital processor and with the digital storage unit and a digital vocalizer at least for converting data stored on the digital storage unit to audio signals.

In a second embodiment, the audio system includes a radio receiver, a digital storage unit, a command input unit for receiving listener commands, a digital vocalizer and a sound player. The vocalizer converts data stored on the digital storage unit to audio signals and enables the listener to browse through and mark data stored in the digital storage unit. The sound player is selectably connected to the outputs of the radio receiver and the digital vocalizer.

Preferably, the processor of the vocalizer includes units for marking those portions of the data which the listener indicates as being of interest and for selecting the marked portions of the data to be provided to a digital interface to be received by an external digital processing unit.

In accordance with a first preferred embodiment of the second audio system, the digital storage unit, command input unit and digital vocalizer are enclosed within a removable housing. The housing can be like the housing of a cassette or like the housing of a PCMCIA module.

In accordance with a second preferred embodiment of the second audio system, only the digital storage unit is enclosed within a removable housing, such as a PCMCIA housing.

In another embodiment, at least the radio receiver and the sound player are enclosed within a portable housing. The portable housing can also include at least one of a radio receiver, a television receiver and a telephone interface receiver.

In another embodiment, an information system, operable with a general purpose computer having data storage means is provided. The information system includes a remote controller for remotely controlling the operation of the computer, audio means operable with the computer, for receiving at least digital data and for converting the digital data into electrical voltage, control means, operable with the computer, for receiving and responding to user commands from the remote controller for playing selected data stored in the data storage means in a user desired way and an audio system, communicating with the computer.

In a further embodiment, a vocal information system is provided which includes the elements of the information system described above and also includes an information center storing at least digital data and a computer, connected to the information center via a communication link, for receiving the digital data into data storage means.

In addition, in accordance with the embodiments of the information systems, the audio system includes receiving means for receiving RF modulated audio signals for the computer and an audio player for producing acoustic audio signals. Alternatively, the audio system includes a cassette adapter for converting the voltage received from the computer into magnetic format and a tape player for playing the magnetic format in order to produce audio signals.

In addition, in accordance with the embodiments of the information systems, the control means can also include a RF receiver, a modulator connected to the computer for converting the audio voltage into RF radiation and a RF transmitter for transmitting the RF radiation.

In addition, in accordance with the embodiments of the information systems, the cassette adapter can also include means for receiving the transmitted RF radiation, an audio decoder for converting RF radiation into analog voltage and a transducer for converting analog voltage into magnetic format.

In addition, in accordance with the embodiments of the information systems, the cassette adapter can further include an RF receiver for receiving remote control commands from the remote controller and means for converting the received remote control commands into digital format. The cassette adapter can also include means for transferring the digital format to the computer.

In addition, in accordance with the embodiments of the information systems, the cassette adapter can further include means for receiving voice activated signals and means for converting the voice activated signals into voltage levels. The cassette adapter includes means for transferring the voltage to the computer.

Furthermore, the data storage means of the vocal information system includes a general information block and a plurality of sections wherein each of the plurality of sections includes at least a plurality of information items. The information items include at least headlines and detailed context for each of the information items.

In addition, the information items also include a marking flag to identify selected items.

BRIEF DESCRIPTION OF THE DRAWINGS

The present invention will be understood and appreciated more fully from the following detailed description taken in conjunction with the drawings in which:

FIGS. 2A and 2B are block diagram illustrations of two alternative embodiments of the elements of the diskette-cassette of FIGS. 1A and 1B;

FIGS. 25A, 25B, 25C, and 25D are block diagram illustrations of further Radio station embodiments;

FIGS. 27A, 27B and 27C are illustrations of a cellular telephone based embodiments.

DETAILED DESCRIPTION OF THE PRESENT INVENTION

Figure 1A:
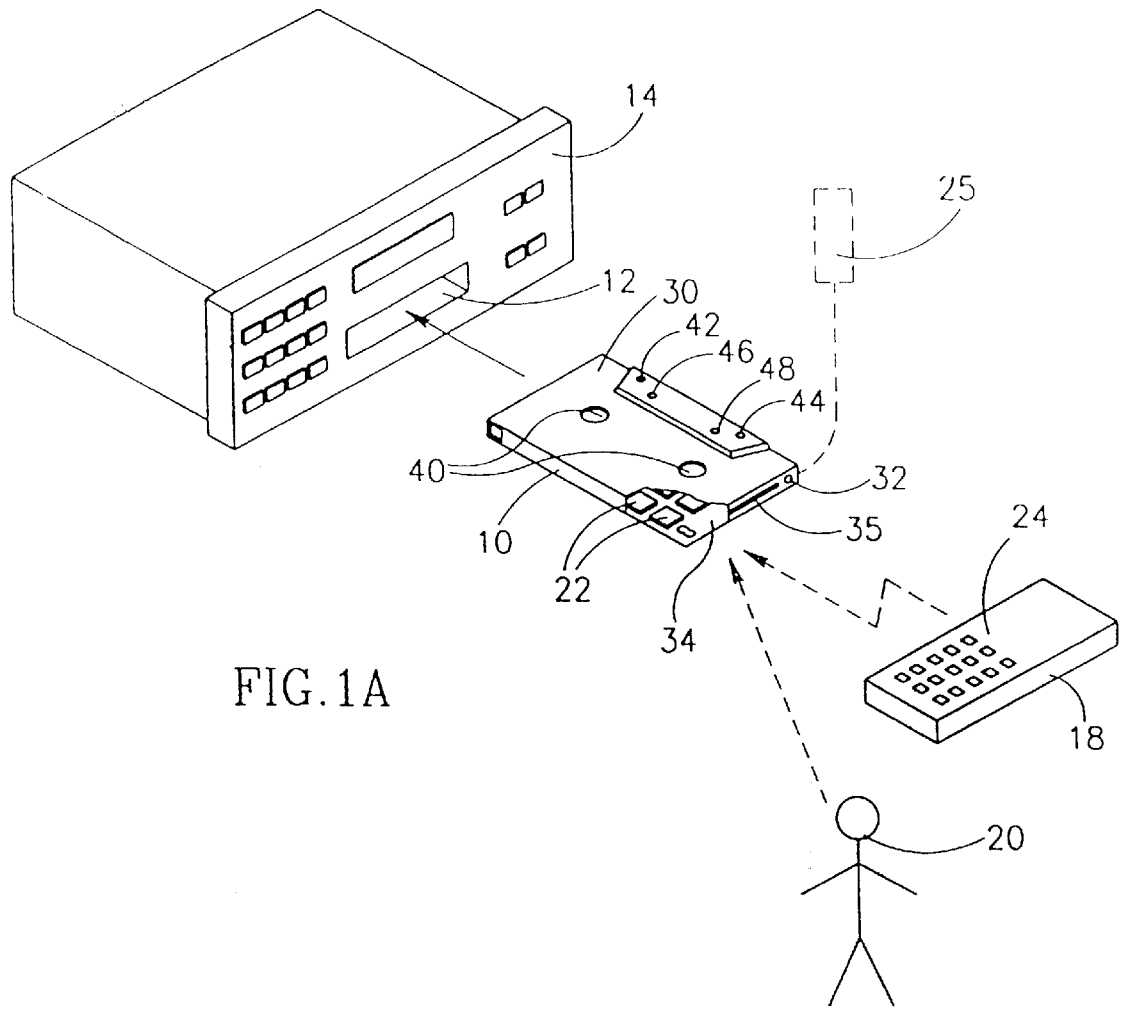
FIG. 1A is a pictorial illustration of a diskette-cassette, constructed and operative in accordance with a preferred embodiment of the present invention, and the audio system into which it is to be placed.
Figure 1B:
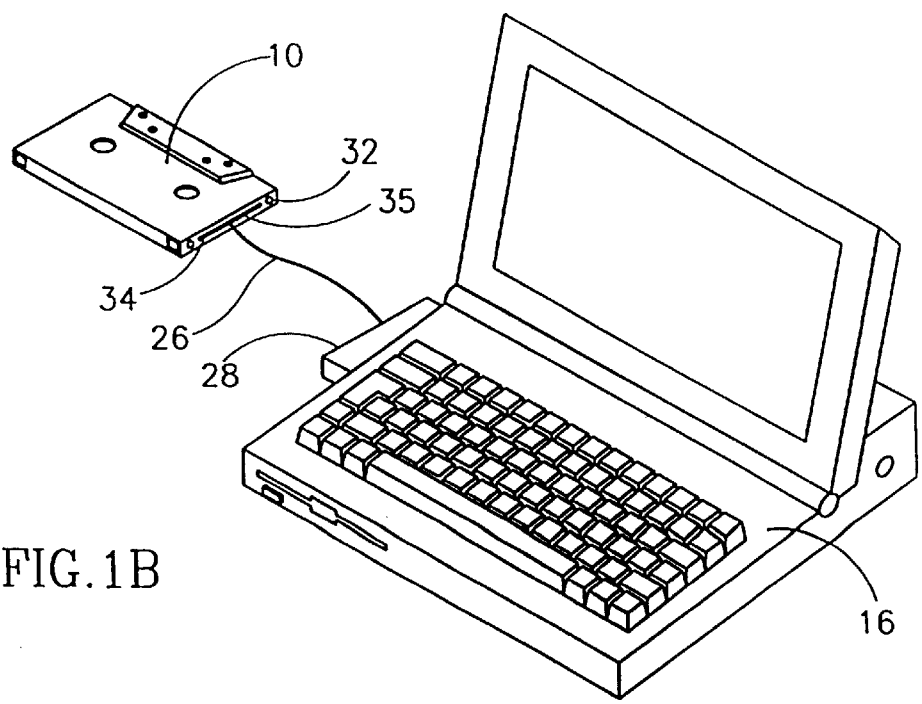
FIG. 1B is a pictorial illustration of the diskette-cassette of FIG. 1A connected to a computer.

Reference is now made to FIGS. 1A and 1B which illustrate the diskette-cassette 10 of the present invention respectively being placed into a player 12 (FIG. 1A), such as the playback deck of an audio system 14, and being connected to a computer 16 (FIG. 1B), such as a laptop computer. FIG. 1A also illustrates a remote controller 18 and a listener 20 who controls the operation of the diskette-cassette 10 either through transmitted signals (via wires or wireless technology), or via voice commands. For an audio system within a car, the remote controller 18 can be placed anywhere within the reach of the passengers. For example, the remote controller 18 can be installed within the steering wheel of the vehicle, or near the gear shift.

Stored on the diskette-cassette 10 is digital data which might be of interest to the listener 20 and which can be retrieved in a random access manner. Furthermore, the diskette-cassette 10 also has electronic units 22 which, in response to the listener's commands, select which data to provide to the playback deck 12 and which data to mark as being of significant interest to the listener 20. The marked data can then be downloaded to the computer 16 for storage therein or for printing out therefrom. New digital data can be stored on the diskette-cassette 10 at any time, such as after the downloading process.

Figure 2A:
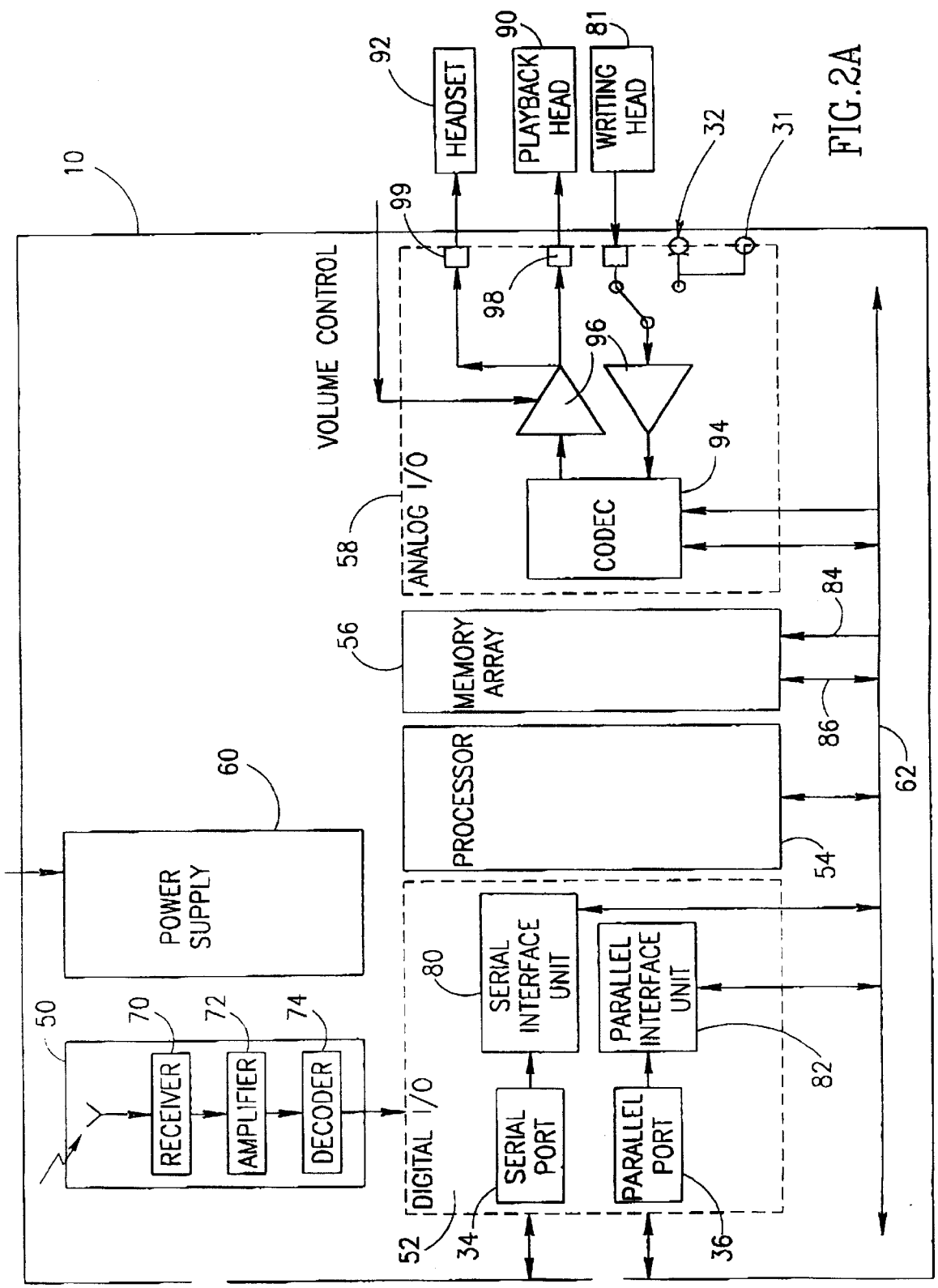
Figure 3:
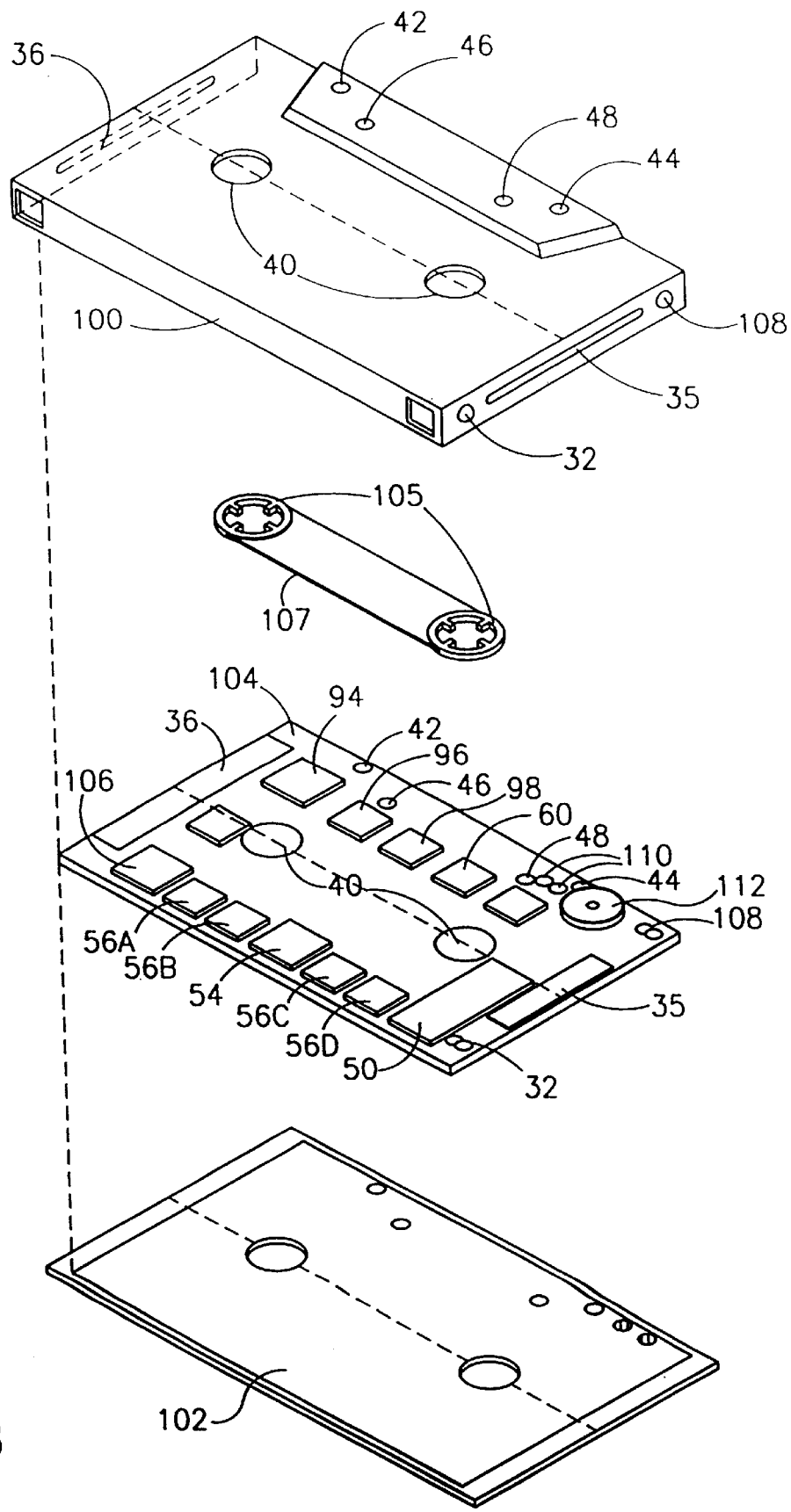
FIG. 3 is an exploded schematic illustration of elements of the diskette-cassette of FIGS. 1A and 1B.

The diskette-cassette 10 comprises a housing 30, electronic units 22 to be described in more detail with respect to FIG. 2, an optional microphone 32, and communication ports 34, 35 and 36 (shown in FIG. 3). The diskette-cassette 10 can optionally include a connection to an external power supply, such as a cigarette lighter 25. Typically, one communication port is a serial port and one is a parallel port, though this is not required. Microphone 32 receives the voice commands of the listener 20, if the remote controller 18 is not to be utilized. Communication ports 34, 35 and 36 are provided in order to communicate with computer 16 via a communication link 26 (FIG. 1B).

The housing 30 (FIG. 1A) has the configuration of a cassette for magnetic tapes which can be read by the playback deck 12. FIG. 1A illustrates the configuration of a standard reel-to-reel cassette which includes openings 40 and apertures 42, 44, 46 and 48. Openings 40 are adapted to receive the reel-drive spindles of the playback deck provided when the cassette 10 is loaded into player 12. Apertures 42 and 44 are adapted to receive the capstan of the playback deck which drives the tape housed within the standard cassette past the playback head of the deck. Apertures 46 and 48 are adapted to receive the guide pins of the playback deck.

In operation, listener 20 connects link 26 between a communication port 28 of computer 16 and one of communication ports 34 or 36, as shown in FIG. 1B. Listener 20 then requests that computer 16 download desired digital data, such as news as text, digitized speech, a series of lectures, or spoken books, from computer 16 onto the diskette-cassette 10. If audio system 14 is a car audio system, the listener 20 places the diskette-cassette 10 into the audio system 14 at some point during his ride, thereby to listen to the News, a talking book or the lectures while driving. In accordance with the present invention, the listener 20 commands the diskette-cassette 10 (via voice or a key pad 24 on remote controller 18) to play various pieces or segments of the digital data stored on the diskette-cassette 10.

The digital data can be either text data or digitized audio data. For digitized audio data, diskette-cassette 10 converts the digitized audio data to an analog form and then provides it to the playback deck. In order to save memory space, the audio data can be compressed and the diskette cassette 10 decompresses the data prior to converting to an analog form. For text data, the diskette-cassette 10 can include a text-to-speech generation unit which converts the text to an audio signal which the diskette-cassette 10 then provides to the playback deck. The diskette-cassette 10 can also operate on data which is a mixture of compressed data and text data.

If the piece currently being played is of such interest that the listener 20 would like to save it, or that he would like a printed copy so as to study the piece in more depth, the listener 20 can command the diskette-cassette 10 to mark the current piece. Upon returning home (or to any place where computer 16 resides), the listener 20 removes the diskette-cassette 10 from the audio system 14 and connects it, via a link 26, to the communication port 28 of computer 16. Computer 16 then uploads the marked pieces and, if indicated by the listener, can also download any new pieces to the diskette-cassette 10. Typically, the downloading process overwrites all digital data previously stored thereon although it can also utilize empty storage spaces.

In addition, the listener can stop listening to the present piece and can skip to the next piece. He can go back to listen to the previous piece. He can select a new section of data to which he can listen, search according to keywords, play the voice data at a faster or slower speed, etc.

It will be appreciated that the diskette-cassette 10 and the resultant audio system having its capabilities provide the listener with the ability to listen to whatever digital data he desires. Furthermore, the present invention enables a listener to sift through a large set of audio pieces or segments, marking for subsequent processing or storage only those segments which are of interest to him.

Reference is now made to FIG. 2A which illustrates, in block diagram format, the elements of the diskette-cassette 10. Diskette-cassette 10 comprises an optional remote control (R/C) receiver 50, a digital input/output interface unit 52, a processor 54, a digital storage unit 56, an analog input/output interface unit 58, a power supply 60 and internal data bus 62.

The power supply 60 can be any suitable power supply, such as a set of batteries or an energy converter, connected to an external power supply such as the 12V cigarette lighter 25 (FIG. 1A). Alternatively, the power supply 60 (FIG. 2A) can be one which generates and stores energy from the rotation of the reel-drive spindles of the playback deck. Power supply 60 provides the energy necessary to run the remaining elements of diskette-cassette 10.

The remote controller receiver 50 can be any suitable receiver which receives the signals from the remote controller 18 and provides the command information transmitted by the remote control signals to the digital interface unit 52. Remote controller receiver 50 typically comprises a signal receiver 70, an amplifier 72 and a decoder 74. The signal receiver 70 can be any type of receiver such as a radio frequency (RF) receiver, an optical receiver or an ultrasound receiver. The amplifier 72 amplifies the output of receiver 70 and the decoder 74 converts the amplified, received signal to one of a set of digital commands. An example of an RF receiver with an intermediate frequency (IF) amplifier demodulator and comparator is the U4313B-FL manufactured by TEMIC Telefunken Semiconductors of Germany. An example of an IR receiver with Pin diode, preamplifier and a direct interface to computing unit, is the TFMS5XXO family manufactured by TEMIC Telefunken Semiconductors.

Digital interface unit 52 receives the digital commands and provides them, via bus 62, to processor 54. Unit 52 also receives, from communication link 26 (FIG. 1B), digital data to be stored in storage unit 56 and provides on output, also via communication link 26, the marked segments of the digital data. Interface unit 52 comprises any suitable communication port controllers, such as a serial interface 80 and or a parallel interface 82. Interfaces 80 and 82 connect to the appropriate ports 34 and 36 on the outer side of diskette-cassette 10. For example, serial interface 80 can is comply with the RS232 or I2C standards and parallel interface 82 can comply with personal computer memory card industry association (PCMCIA) standards.

Digital storage unit 56 comprises at least one FLASH electrically programmable read only memory (EPROM) array having a multiplicity of storage elements. Each storage element stores 1 bit of data and typically, storage unit 56 comprises several mega bits. Alternatively, unit 56 can comprise erasable electrically programmable read only memory (EEPROM) arrays, or any other non-volatile memory array such as writable optical or magnetic media. Storage unit 56 stores both the downloaded data, received via digital interface unit 52, the software program which operates the diskette-cassette 10 and any other information needed for operating the diskette-cassette 10.

As is known in the art, storage unit 56 receives address signals 84 and data signals 86. The address signals 84 indicate the address within the array at which the data of the data signal 86 is to be stored or from which the data is to be retrieved. Both the processor 54 and the digital interface unit 52 can provide the address signals 84. On input, digital interface unit 52 provides the data signals 86.

The analog interface unit 58 communicates with the playback head, labeled 90, of the playback deck 14 and, optionally, with a microphone 32. It can also communicate with a speaker headset 92, if desired. Interface unit 58 comprises a codec 94, suitable amplifiers 96, microphone 32, an audio to magnetic field transducer 98 and a headset interface 99. Codec 94 can be any suitable codec, such as monolithic codec TP3056 manufactured by National Semiconductors USA or 3052 Voice Combo by TEMIC. Audio transducer 98 can be any suitable voltage to magnetic transducer, such as a common stereo magnetic tape recording head, which enables the magnetic playback head of player 14 to pick up the signal as though it was picked up from a magnetic tape. The analog interface unit 58 also enables signals to be written to the storage unit 56 from the writing head 81 of the tape deck.

There are optional connectors 31 and 90 for external microphone (not shown) and an external headset 92 respectively, and a control means such as variable resistor or selector.

On input, interface unit 58 optionally receives voice signals, typically from listener 20 via microphone 32, providing voice commands to the processor 54. Codec 94 digitizes the voice signals and provides them to processor 54 to determine the command using speech recognition technology, and to respond accordingly. This voice acquisition capability enables the user also to record vocal memos onto the diskette-cassette. On output, codec 94 receives digitized audio data from storage unit 56 after being converted to digital audio signal by processor 54, converts them to analog signals and provides them, via amplifiers 96, to audio record head 98. Audio record head 98, which is located near the playback head of player 14, provides the audio signals to the player 14. Alternatively, the output of amplifiers 96 is provided to a headset interface 99 which provides the audio signals to the speakers of a headset.

Processor 54 is typically a microprocessor, a digital signal processor or a combination microcontroller and digital signal processor. A suitable combination microcontroller-digital signal processor is the NS32AM160 family, manufactured by National Semiconductor Inc. of the USA and a suitable digital signal processor is the D6371, manufactured by DSP Group Inc. of the USA. A suitable microprocessor is one of the complex or reduced instruction set computer (CISC or RISC) types.

Processor 54 provides overall management of the diskette-cassette 10 and responds to the listener's commands. If the commands are voice commands, the processor 54 processes the digitized voice signals, in accordance with standard voice processing and recognition techniques, to determine the spoken command. Subsequent processing is the same for voice and remotely controlled commands. Processor 54 manages the storage unit 56, supervising the download process, retrieving segments of the digital data to be played, converting them to digital sound using "text-to-speech" or decompression techniques and providing them to the audio interface unit 58, adding marks to the digital data whenever the listener 20 so indicates to mark the currently played segment, and retrieving the marked segments during an upload operation.

As shown in FIG. 2B, to which reference is now briefly made, the diskette-cassette can include one or more of the following means for direct loading of data:

a) a telephone line or wireless interface 91;

b) a radio interface 93, including a tuner 95 and a decoder 97, such as the U2514B tuner and the radio data service (RDS) decoder 04284BM-FP, both manufactured by TEMIC; and c) a television interface 99, including a tuner 101 such as the U2321BFB manufactured by TEMIC and a decoder 103, such as a Teletext decoder.

Reference is now briefly made to FIG. 3 which illustrates an example of the layout of the diskette-cassette 10. The housing 30 is split into an upper section 100 and a lower section 102. Within the two sections is a printed circuit board 104 having connected thereto the elements illustrated in FIG. 2A. It is noted that all three elements, sections 100 and 102 and printed circuit board 104, have the openings 40 and apertures 42–48 cut out therefrom.

As can be seen, the various elements fit around the openings 40 and apertures 42–48. The processor 54, digital storage unit 56 (shown split among four elements, 56a, 56b, 56c and 56d), codec 94, glue logic 106 such as custom specific application specific integrated circuit (ASIC), erasable programmable logic device (EPLD), programmable array logic (PAL), etc., amplifier 96 and audio transducer 98 are utilized to interface between the diskette-cassette 10 of the present invention and the playback deck 14. Glue logic 106 typically provides signal and timing matching and simple logic operations. The power supply 60 converts and supplies all the internal power requirements. An external power connector 108 and/or touch connectors 110 are used to connect to external power, such as the cigarette lighter 25.

The audio input/output elements include the optional microphone 32, the analog input elements 96, and an optional volume control knob 112. The digital interface elements include the interface chip 52. The optional remote control receiver is implemented as a module 50. Connector 36 is generally a parallel port. Connector 35 may be configured to include serial port 34, external audio-in 31, external audio-out 99 and volume control 97. Connector 35 may also be configured to connect to an external power source and many have spare pins (not shown).

Diskette cassette 10 further comprises a driving mechanism which is includes a pair of hubs 105 connected by belt 107. The hubs 105 rotate in synchronism with each other due to the movement of belt 107.

FIG. 3 is an example only. The function described in FIGS. 2A and 2B can be implemented using SMT and chip on board, or in a much more condensed way utilizing customer specific ASICs. The diskette cassette can be smaller in size to be able to be inserted in a PCMCIA slot, as long as it can still be played in a tape player.

Figure 4:
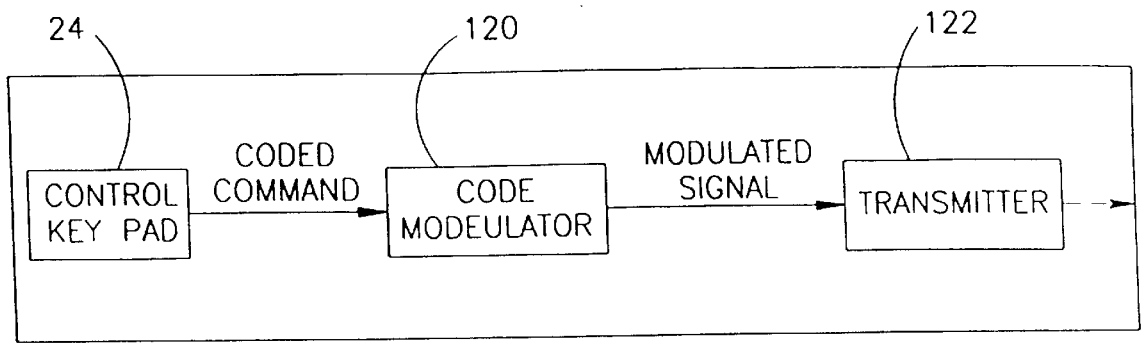
FIG. 4 is a block diagram illustration of a remote controller useful in controlling the operations of the diskette-cassette of FIGS. 1A and 1B.

Reference is now briefly made to FIG. 4 which illustrates the elements of the remote controller 18. Controller 18 comprises key pad 24, a code modulator 120 and a transmitter 122. The key pad 24 produces the commands in a coded format. Code modulator 120 creates a modulated signal as a function of the selected code. Transmitter 122 transmits the modulated signal to the remote control receiver 50 of the diskette-cassette 10.

The following transmitters are suitable: an RF transmitter such as V2740B by TEMIC, an IR transmitter such as the TMEB8XXX by TEMIC or the LM1871RC encoder transmitter manufactured by National Semiconductor USA, or an ultrasonic transceiver such as the LM1812 by National Semiconductor.

It will be appreciated that the present invention produces an audio system having the ability to play previously stored digital data, to sift through that data in accordance with the listener's wishes and to mark desired sections of the stored digital data. It will further be appreciated that the present invention provides an audio system in which at least marked digital data can be removed and then uploaded to an external computer. In particular, the marked data is uploaded, although other data can also be uploaded.

Figure 5A:
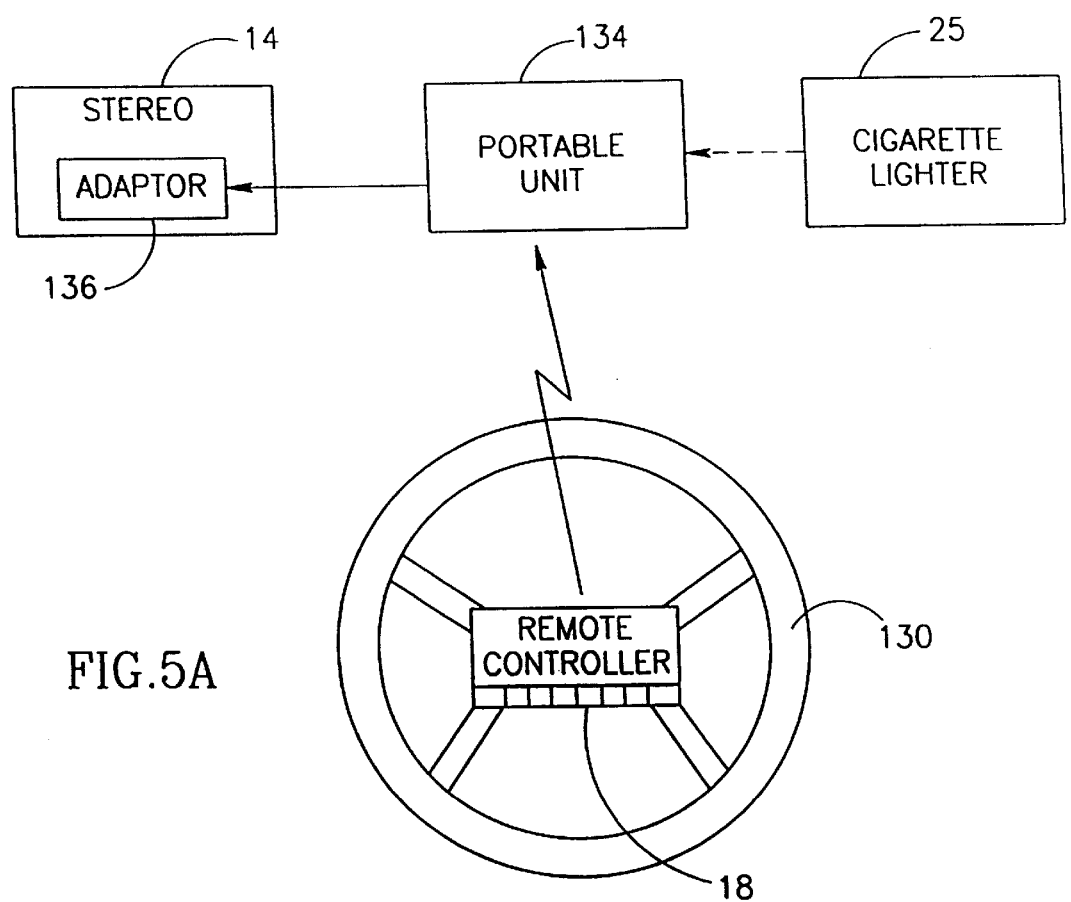
FIGS. 5A and 5B are schematic illustrations of two alternative arrangements of the audio system of the present invention.
Figure 5B:
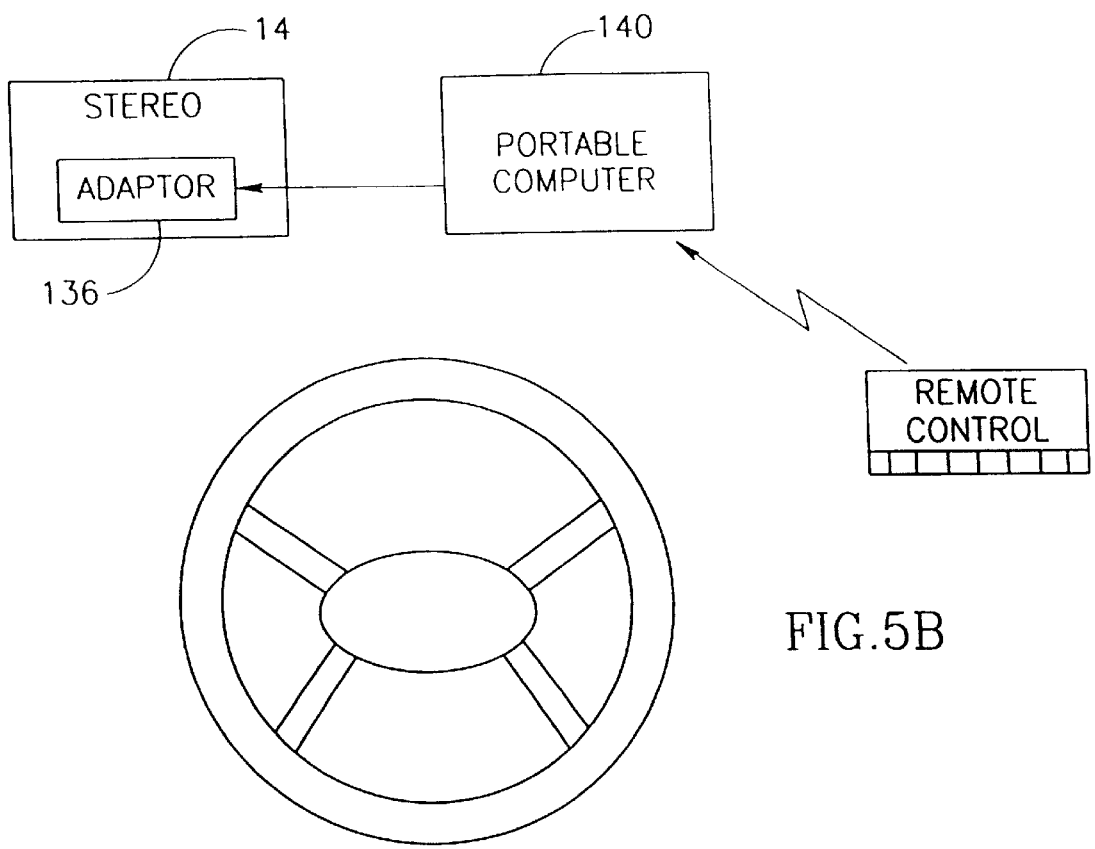

Reference is now made FIGS. 5A and 5B which illustrate two alternative embodiments of the audio system of the present invention. FIG. 5A illustrates a steering wheel 130 in which a remote controller 18 is mounted, the vehicle audio system 14, a portable unit 134, and a digital to tape adapter 136. The adapter 136 can be any suitable adapter, such as the one described in U.S. Pat. No. 4,734,897, for playing is the output of a compact-disc player.

The portable unit 134 comprises the remote receiver 50, the digital interface unit 52, the processor 56, the storage unite and the codec 94 of FIG. 2A. The remaining elements of the audio interface unit 56 (in particular, the audio to magnetic transducer 98) form part of the adapter 136. If necessary, the portable unit 134 can get power from the cigarette lighter 25.

In this embodiment, the adapter 136 only provides the audio signal for playing by the playback deck. Therefore, adapter 136 can remain in the audio system 14 and portable unit 134, which produces the audio signal, can be ported between the computer 16 and the vehicle. Portable unit 134 operates as described hereinabove with respect to diskette-cassette 10 except for providing the interface to the playback deck of player 14.

In the embodiment of FIG. 5B, the elements of portable unit 134 are implemented in a portable computer 140 or are provided as an add-in card to portable computer 140. Portable computer 140 then operates as described hereinabove, providing the sifting tools and the digital data playing ability to the audio system 14.

Figure 5C:
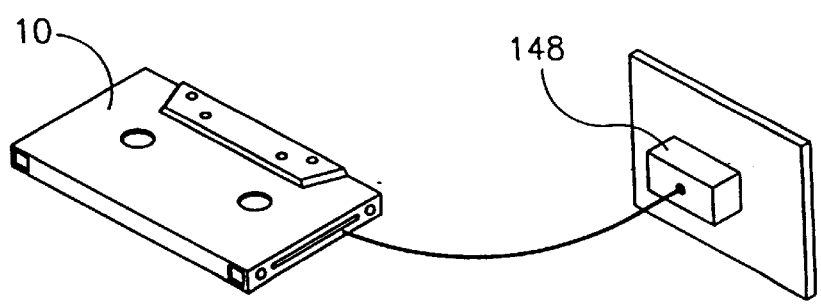
FIG. 5C is a schematic illustration of the connection of the diskette-cassette of the present invention to a source of information such as telephone and television.

Reference is now briefly made to FIG. 5C which illustrates the diskette-cassette 10 connected directly to an external information source 148, such as a telephone line, a television antenna, etc. The receiving elements 91, 93 and 99 of the diskette-cassette 10 receive the externally provided information and direct them to the memory array 56.

Figure 6A:
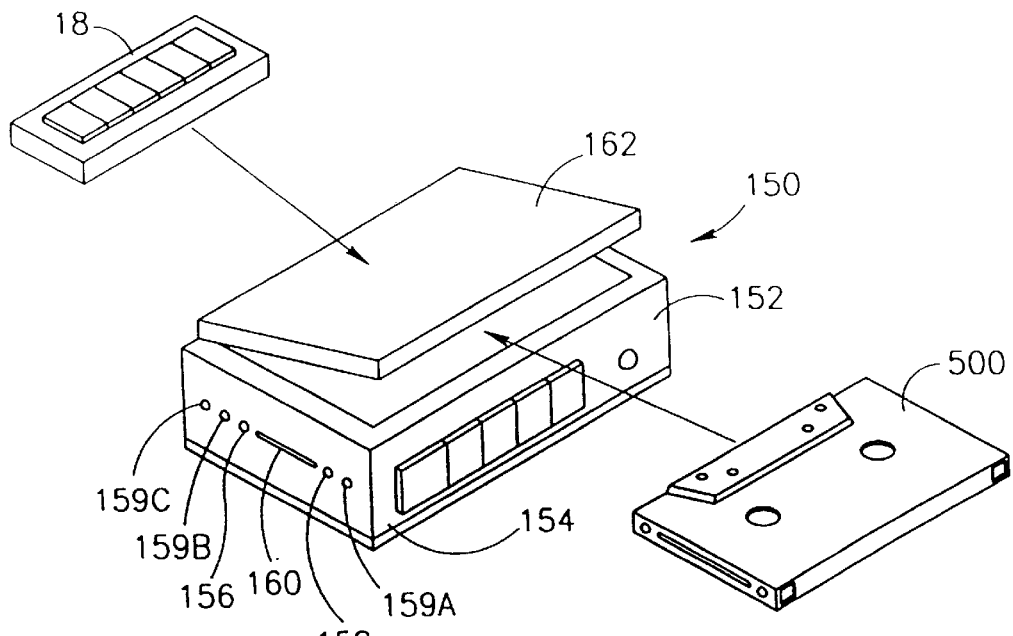
FIG. 6A is a pictorial illustration of the diskette-cassette of the present invention and an associated player.
Figure 6B:
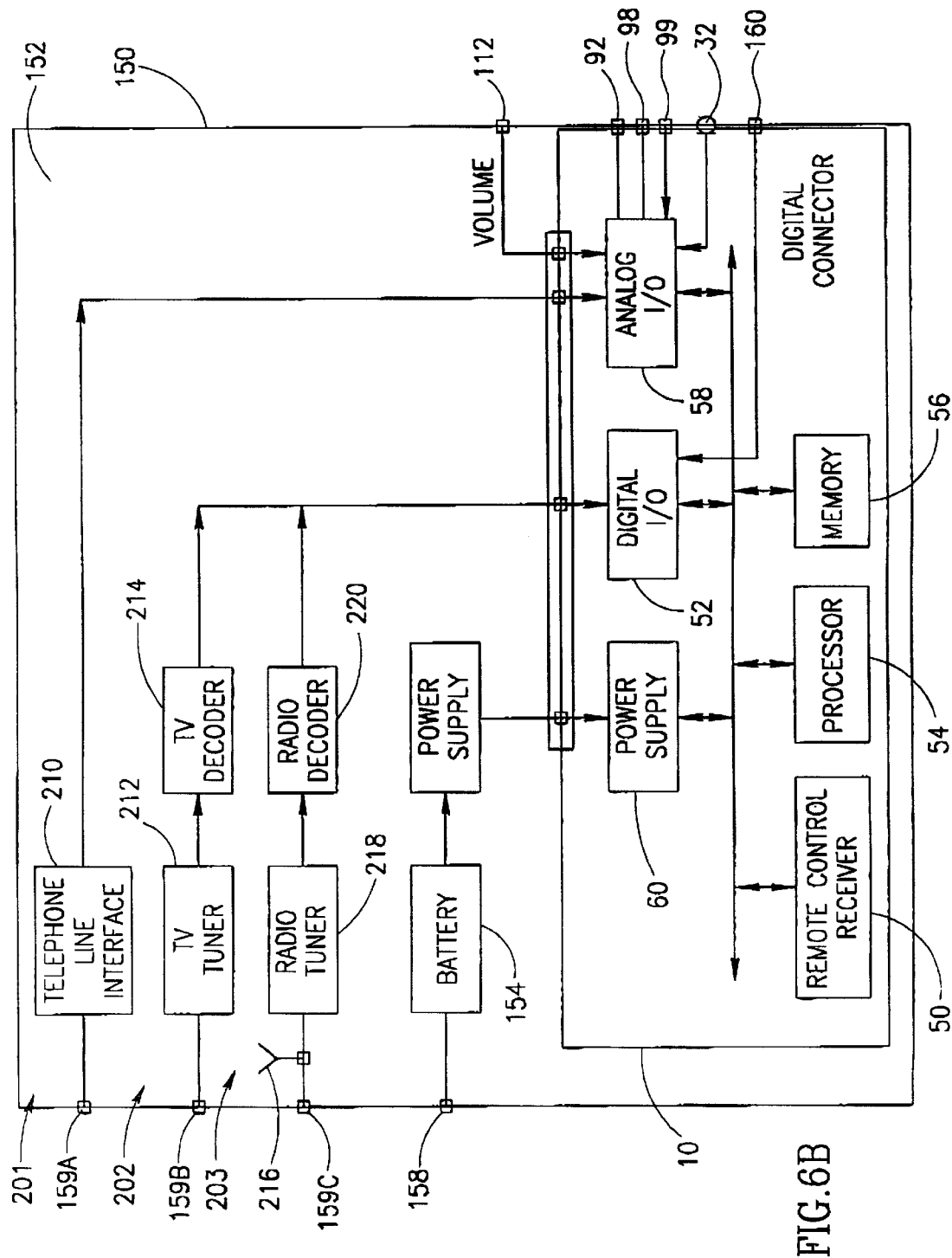
FIG. 6B is a block diagram illustration of the elements of the associated player.

Reference is now made to FIGS. 6A and 6B which illustrate the diskette-cassette 10 of FIGS. 1–3 in conjunction with a separate playing unit 150 called the "diskette-cassette cradle". FIG. 6A is an isometric view of the diskette-cassette cradle 150 and FIG. 6B is a schematic diagram of the electrical circuitry in the diskette-cassette cradle 150.

The diskette-cassette cradle 150 is an independent unit which comprises a cassette cradle 152, a battery pack 154, a headset socket 156, an external charger socket 158, one or more communication sockets 159 and a digital communication link socket 160. For example, and as shown, the communication sockets 159 might include a telephone socket 159a, an RF television connector 159b, and an RF radio connector 159c. The cassette cradle 152 comprises an upliftable cover 162 and standard cassette playing elements, such as the playback head, the capstans, the spindles, etc. (not shown). The remote controller 18 can form a separate element, as described previously, or it can be mounted on the cassette cradle 152, as shown.

The cradle 150 performs the following operations:
a) receiving and downloading information (text and/or digitized audio signals) to the diskette-cassette 10;
b) operation of the diskette-cassette 10 to play the stored information and marking those information segments which the user indicates as interesting; and
c) uploading the marked segments to an external computer for storing, printing and/or distribution.

In order to receive the information, the cradle comprises, as shown in FIG. 6B, telephone, television and/or radio receiving units 201, 202 and 203, respectively. The telephone receiving unit 201 enables the cradle 150 to receive the information via the telephone network. The telephone receiving unit 201 comprises telephone line connector 159a and a telephone line interface 210. Interface 210 handles the telephone line signals, impedance matching and other activities as described in the documentation of the NSV-AM160-DAA interface manufactured by National Semiconductors Inc. of the USA.

The television receiving unit 202 receives the information via techniques such as the Teletex system or any other modulation technique. One Teletex system is described in the *World System Teletext Specification* of the UK Department of Trade and Industry. The unit 202 comprises radio frequency (RF) connector 159b for connecting to an antenna or to a cable television cable, a television tuner 212 and a television decoder 214. Television tuner 212 selects the channel and converts the received television signals to video signals. Decoder 214 decodes the digital information in the television signals. An example decoder is the SAA Enhanced Computer Controller Teletex circuit (ECCT), commercially available from Philips Elcoma.

The radio receiving unit 203 comprises RF connector 159c, an internal radio antenna 216 such as those utilized in portable radios, a radio tuner unit 218 such as those used in portable radio receivers and a radio decoder 220 to decode the modulated digital information. One such radio decoder is manufactured by RE America Inc. of Ohio, USA.

In addition, the cradle 150 comprises a power supply unit for supplying power both to the receiving units 201–203 and to the diskette-cassette 10 when it is within the cradle. FIG. 6B also illustrates the elements of the diskette-cassette 10 and indicates how they interface with the elements of the cradle 150.

It will be appreciated that the playing unit 150 provides both the functions of the playback deck of the audio system 14 of the previous embodiments and a connection to computer 16 (FIG. 1B) for downloading the data to be played.

Figure 7:
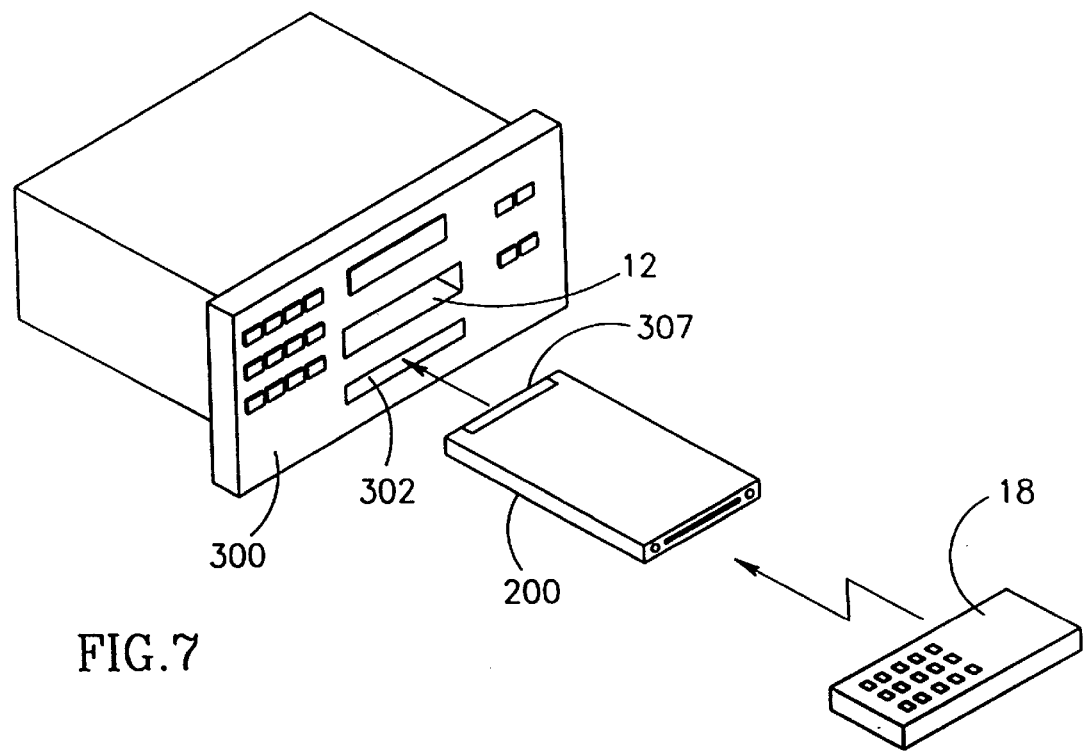
FIG. 7 is a pictorial perspective illustration of a further embodiment of the audio system of the present invention utilizing a removable cartridge.
Figure 8A:
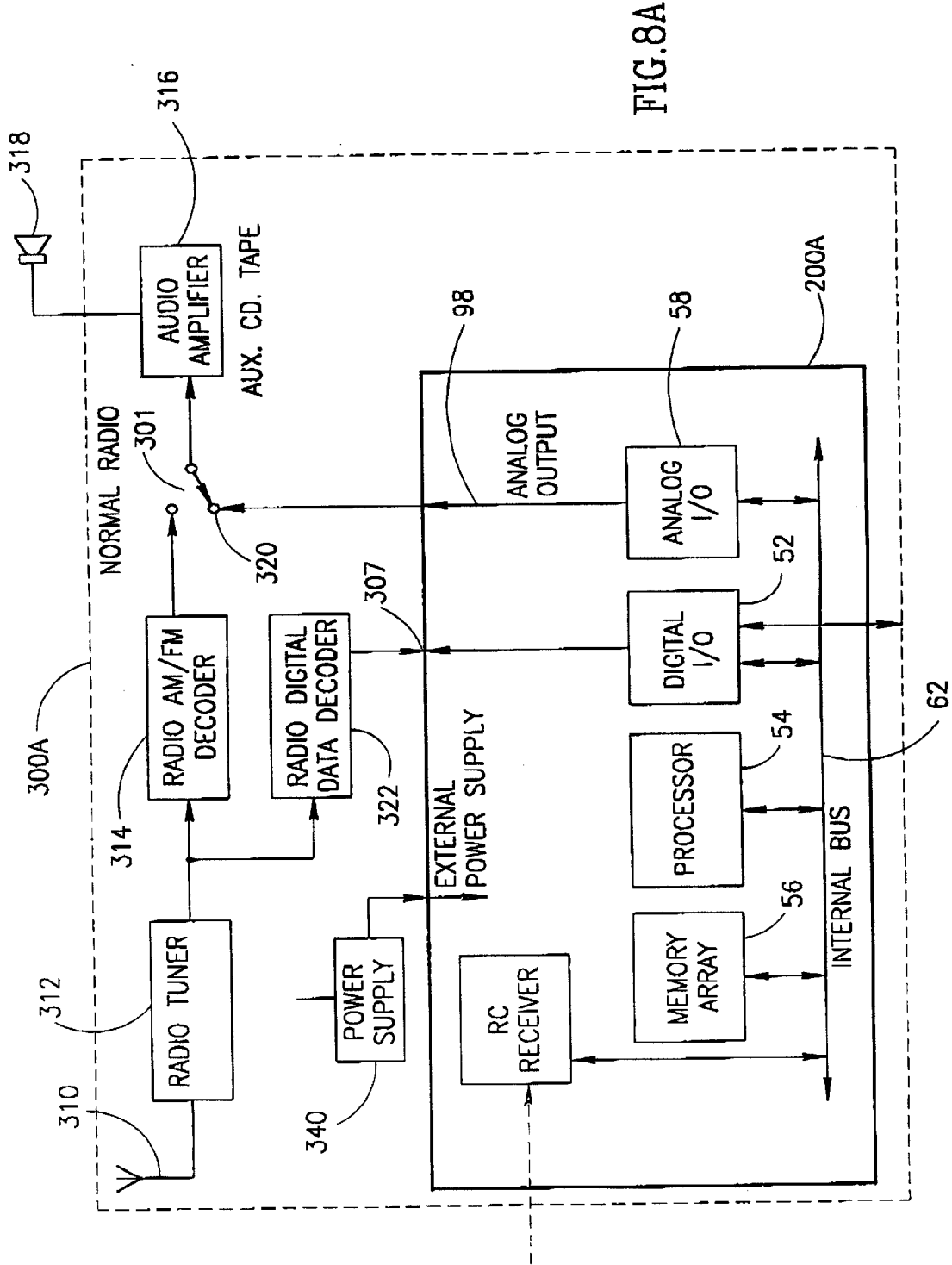
FIGS. 8A and 8B are block diagram illustrations of two alternative arrangements of the audio system of FIG. 7.
Figure 8B:
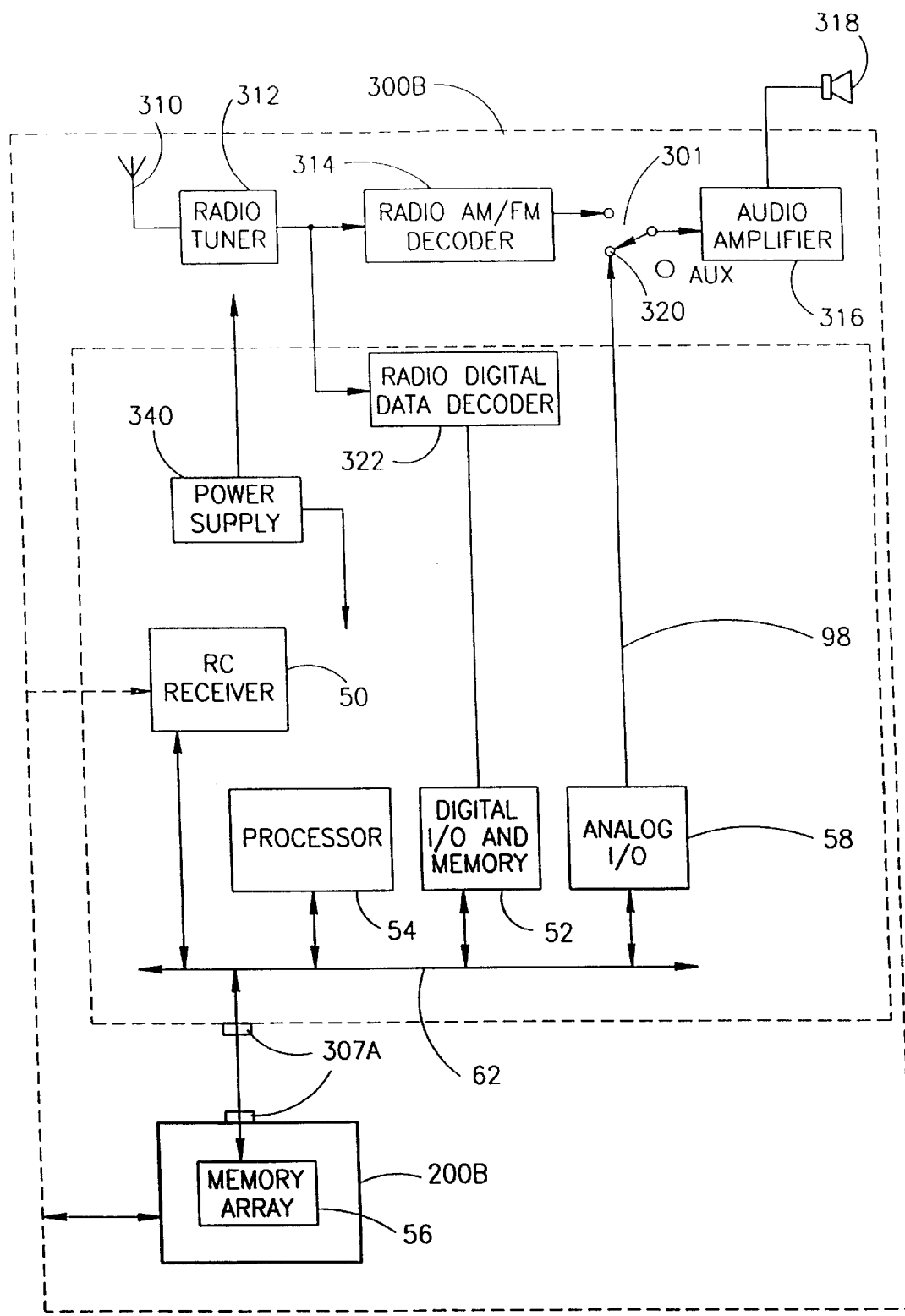

Reference is now made to FIGS. 7, 8A and 8B. FIG. 7 isometrically illustrates an audio system 300 receiving a cartridge 200 and FIGS. 8A and 8B schematically illustrate two alternative embodiments of the combined cartridge-audio system.

As can be seen in FIG. 7, the audio system 300 has a slot 302 into which the cartridge 200 is placed and from which the cartridge 200 is removed. The cartridge 200 is formed of a removable plug-in unit, such as a PCMCIA card. Furthermore, in this embodiment, the audio system 300 receives the digital information and downloads it onto the cartridge.

FIG. 8A illustrates one embodiment of the system of FIG. 7 in which the processing functions of storing the received data, converting the stored data from digital to audio signals and sifting through the stored data are performed by the cartridge, labeled 200a. FIG. 8B illustrates a second embodiment in which the cartridge, labeled 200b, is just a storage device and the remaining digital vocalizing operations of processing the data stored thereon are performed by the audio system, labeled 300b.

In both embodiments, the audio system 300 comprises standard audio reception elements, such as an antenna 310, a tuner 312, an AM/FM decoder 314, an audio amplifier 316 and a speaker 318. In addition, the audio system 300 comprises a radio digital data decoder 322 for decoding digital data, such as might be provided along a radio data service (RDS) carrier frequency. For example, one RDS carrier frequency is at 57KHz.

The audio system 300 downloads the data from the RDS carrier frequency into the memory array 56 of the cartridge 200, via its digital I/O unit 52 and a connector 307, at any appropriate time, such as while the listener listens to a standard radio station or while the audio system is on but not playing any radio station. When the listener decides to browse the data stored in the memory array 56, he or she commands the audio system 300, via the remote control unit 18 or via voice commands, to switch, via switch 301, the input to the audio amplifier 316 from the radio decoder 314 to the output of the cartridge 200. After which, the user browses through the data stored in the memory array 56 as described hereinabove. As in the previous embodiments, the cartridge 200 is removable and the marked data segments can be output to an external computer.

In the embodiment of FIG. 8B, the cartridge 200b comprises the memory array 56. The remaining digital vocalizing elements (remote control receiver 50, processor 54, digital I/O 52, analog I/O 58 and internal bus 62) are implemented within the audio system 300b. The audio system 300b includes a connector 307a such as a PCMCIA connector, for connecting the memory array 56 on the cartridge 200b to the internal bus 62. In this embodiment, the digital I/O unit 52 typically also comprises a small-memory unit.

Figure 24A:
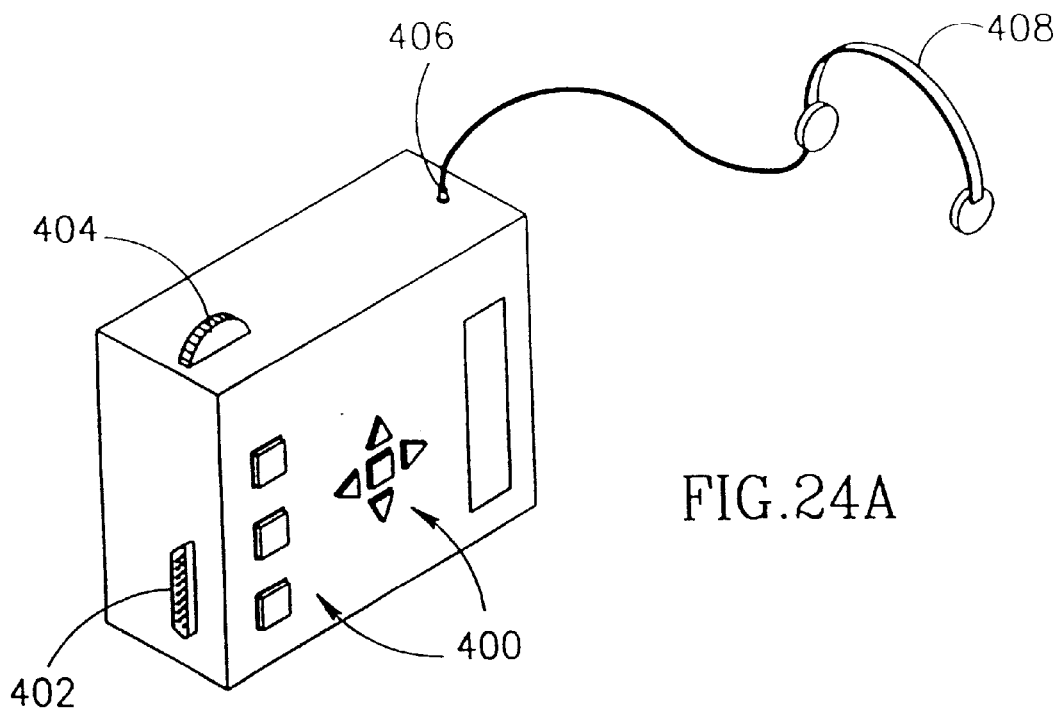
FIGS. 24A and 24B are block diagram illustrations of two alternative arrangements of the audio system of the present invention within a hand-portable unit. of FIG. 7.
Figure 24B:
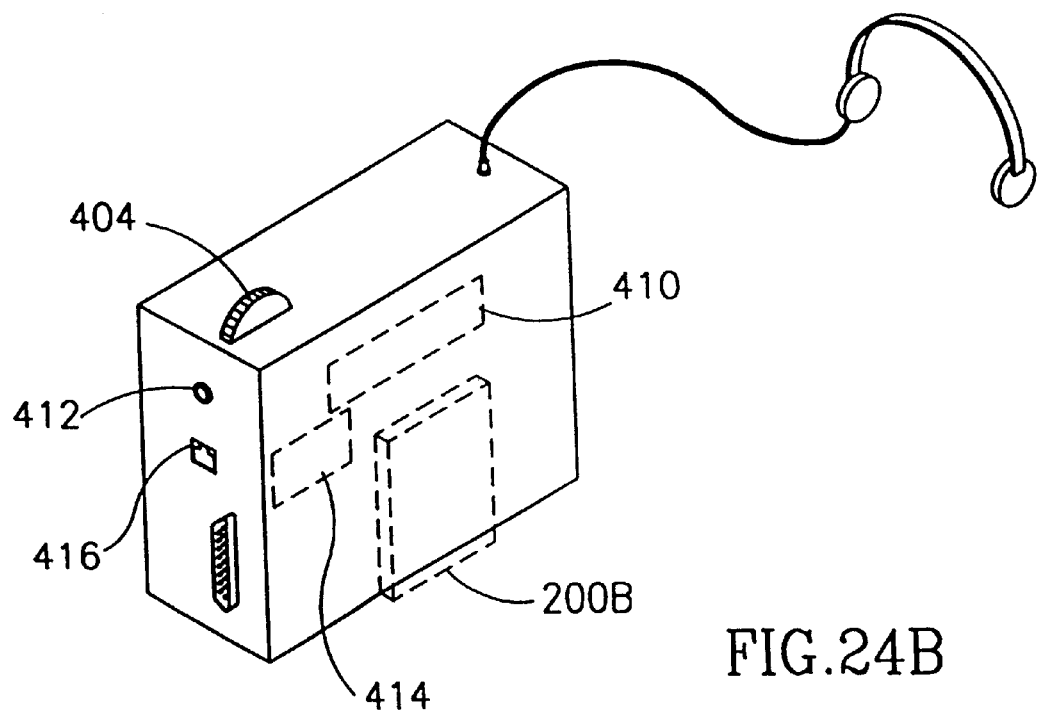

FIGS. 24A and 24B, to which reference is now made, provide the audio system of the present invention within a hand-portable unit. The digital vocalizing elements, such as processor 54, digital I/O 52, analog I/O 58, internal bus 62, and the storage unit 56, and optionally, remote control receiver 50, are located within the hand-portable unit and perform the operations filly described hereinabove.

Externally, the hand-portable unit has keys 400 for providing the browse, next, back, mark, etc. commands for moving through the information to be heard. The hand-portable unit also has a communication connector 402 for connecting to an information source, such as a computer, and for downloading input information signals into the memory unit and/or uploading marked data segments. In addition, the hand-portable unit has a volume control 404, an audio connector 406 and a set of earphones 408 which attach to the audio connector 406.

As shown in FIG. 24B, the hand-portable unit can include an exchangeable memory unit, such as cartridge 200b (FIG. 8B). The hand-portable unit can additionally include a tuner 410 and an associated input signal connector 412 for receiving radio, television or satellite input information signals. The hand-portable unit can additionally, or alternatively, include a modem 414 and its associated telephone connector 416 for downloading input information signals into the memory unit and/or for uploading marked data segments.

It will be appreciated that the hand-portable unit can include other elements of standard hand-portable units, such as a radio and/or a cassette-tape player. Furthermore, it can include a microphone for receiving audio signals and means for recording such audio signals on the memory unit (either storage unit 56 or removable unit 200b). The hand-portable unit then operates as a message device. Since the handportable unit is connectable to a computer, either via digital connector 402 or via modem 414 or by physical removal of the cartridge 200b, the messages can then be downloaded to a separate computer for further processing.

It will be appreciated that the present invention provides an audio system with the ability to browse through and mark, if desired, stored digital data. Some or all of the stored and/or marked data can be copied from the audio system for further processing. Furthermore, new data can be added. The addition and copying of data is by connection to a digital source of data, such as a computer, either through a digital connecting unit (a cable) or by physical removal of at least the digital storage unit and its connection to the digital source of data.

The present invention also encompasses a vocal information system which has the ability to play audio digital data and which can provide such data externally. Further features of the present invention will be described in conjunction with the drawings.

Figure 9:
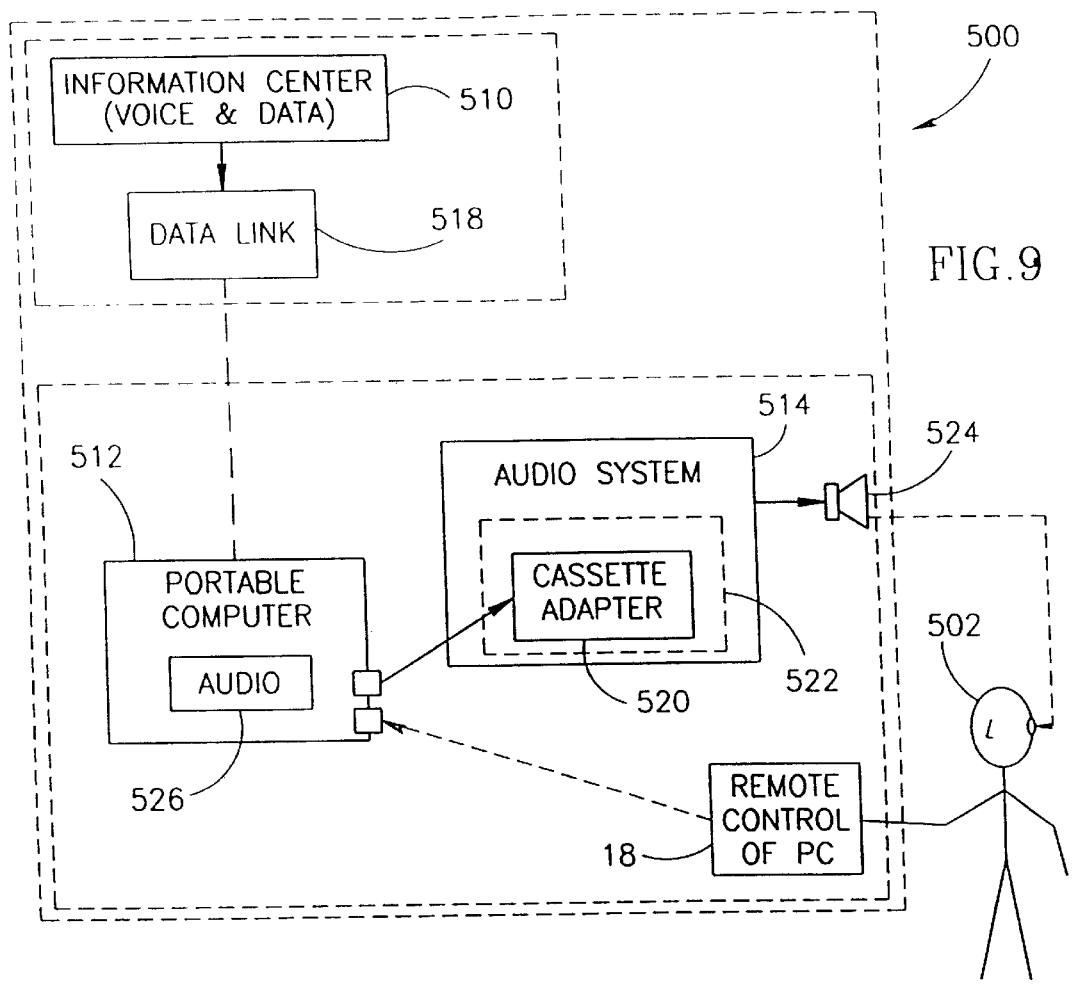
FIG. 9 is a block diagram illustration of a vocal information system of the present invention.

Reference is now made to FIG. 9 which illustrates the vocal information system 500 of the present invention which enables both digital and audio data to be received by a portable computer 512. Computer 512 is connected to an audio system 514 having an audio cassette adaptor 520 which converts the received signals into magnetic format so that the data can be played by the playback deck of the audio system 514. Vocal information system 500 comprises an information center 510, a portable computer 512, an audio system 514 and a remote controller 18.

Information center 510 contains audio and text data which is transmitted in the form of digital data via a communication link 518. The transmitted (downloaded) data contains coded vocal information data which is stored in portable computer 512. Portable computer 512, which is connected to audio system 514, converts the coded vocal information into analog format. Audio system 514 includes a cassette adapter 520 and a tape deck 522. Cassette adapter 520 converts the analog vocal information into magnetic format which is then played back by the tape deck 522 of audio system 514 through speakers 524.

Portable computer 512, which can be any transportable computer, such as a notebook computer, contains an internal audio card 526 which complies with personal computer memory card industry association (PCMCIA) standards or standard built-in audio board, for playing the vocal information. Portable computer 512 converts the coded vocal information by using voice or audio decompression, text-to-speech algorithms, and digital to analog conversion. Voice decompression may be any known in the art system, such as Truespeech™ supplied by DSP Group, Inc. of Santa Clara, Calif. USA. Text to speech may be any known in the art system, such as the system supplied by Creative Labs Inc. of Milpitas, Calif., USA.

Communication link 518 may be any communication link, such as the Internet, which allows for the downloading of data from an information supplier via a telephone link. Alternatively, the communication link 518 between information center 510 and portable computer 512 may be any of known methods of Radio Frequency (RF) communication such as radio, television, cable television, with a main carrier or subcarrier, using AM (amplitude modulation) or frequency modulation (FM), phase modulation or digital modulation, such as HSDS, RDS A further alternative is via an optical network.

Portable computer 526 is connected to the data link via a suitable adapter, for example, by a modem connected to a telephone line. Alternatively, connection may be made to a cellular network, by, for example, via a cellular modem of a type manufactured by the Megahertz Company of USA, or via a wireless modem of a type, such as "The Power Series of Motorola", manufactured by Motorola Co. Inc of USA. A further alternative means of connection is via a radio frequency (RF) link. Generally, a RF link comprises a RF modem including a RF receiver, a decoder and a computer interface.

Remote controller 18, as described with respect to the embodiment of FIG. 4, controls the operation of the a portable computer 512 via audio card 526 either through transmitted signals (via wires or wireless technology), as described hereinbelow with respect to FIGS. 11–14. Alternatively, computer 512 may be controlled by voice commands.

The listener 502 uses remote controller 18 to navigate through the vocal information stored in a portable computer 512, and to mark information segments of interest.

Cassette adapter 520, of a type known in the art, such as the ones described in U.S. Pat. Nos. 4,764,897 and 5,307,326 originally designed for use with compact disc players, can be directly connected to audio card 526.

Figure 10:
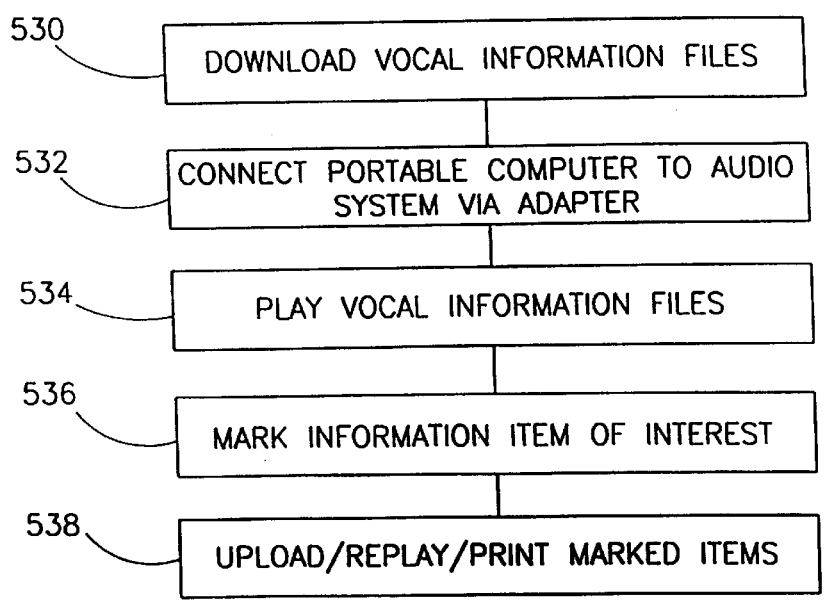
FIG. 10 is a flow diagram illustration of the use of the vocal information system of FIG. 9.

Reference is now made to FIG. 10 which is a flow chart illustration of the use of the vocal information system 500 FIGS. 17–22, described in more detail hereinbelow, provide more details of the operation of the system 500. The user 502 downloads files (step 530) containing coded sound, audio or text from any source, such as the Internet to his 2 portable computer 512. The user 502 then brings the portable computer 512 to an audio system 514 in his house or car and connects the cassette adapter 520 to the audio card output 526 of the portable computer 512 at one end. He also inserts the adapter 520 into the cassette socket of the tape deck 522 of the audio system 514 (step 532). The user 502 then indicates (step 534) to the portable computer 512 to play the vocal information files. The computer will provide the sound signals through the audio card 526 which, in turn, provides the signals to the cassette adapter 520 which, in turn, provides the signals to the audio system 514 which plays them.

The listener 502 can use his remote controller 18 to control the portable computer 512 in order to select from various options such as skipping forward or backward to another piece. He can also select information to be played from a vocal menu (provided as part of the system), or play the voice data at a faster or slower speed. If the piece currently being played is of interest to the listener 502, so that he would like to save it, or print out a hard copy for further study, the listener 502 can 'mark' the current piece (step 536). At a later stage, the listener 502 can upload the marked pieces for storage or printing (step 538).

Figure 11A:
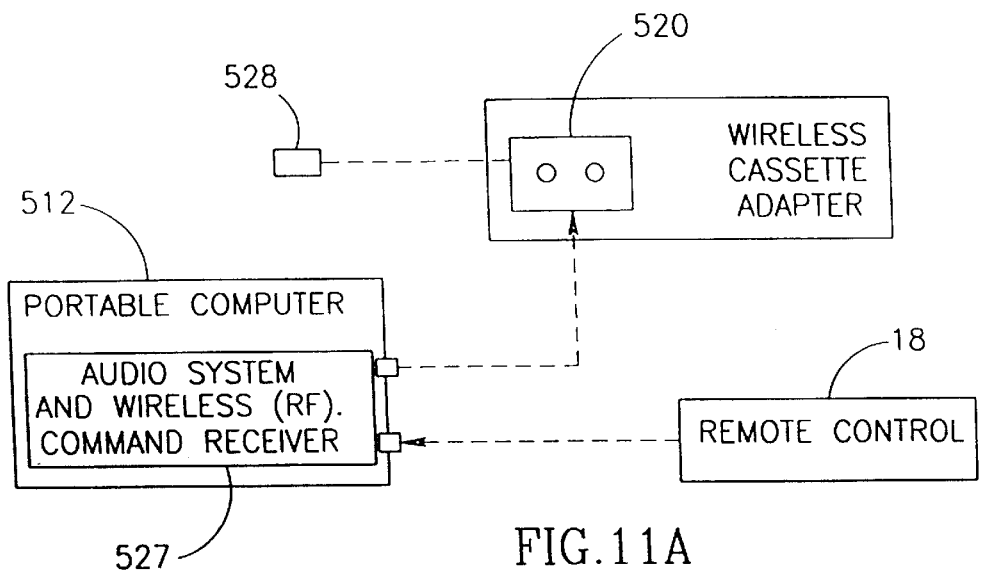
FIG. 11A is a schematic illustration of an embodiment of the vocal information system of FIG. 9.
Figure 11B:
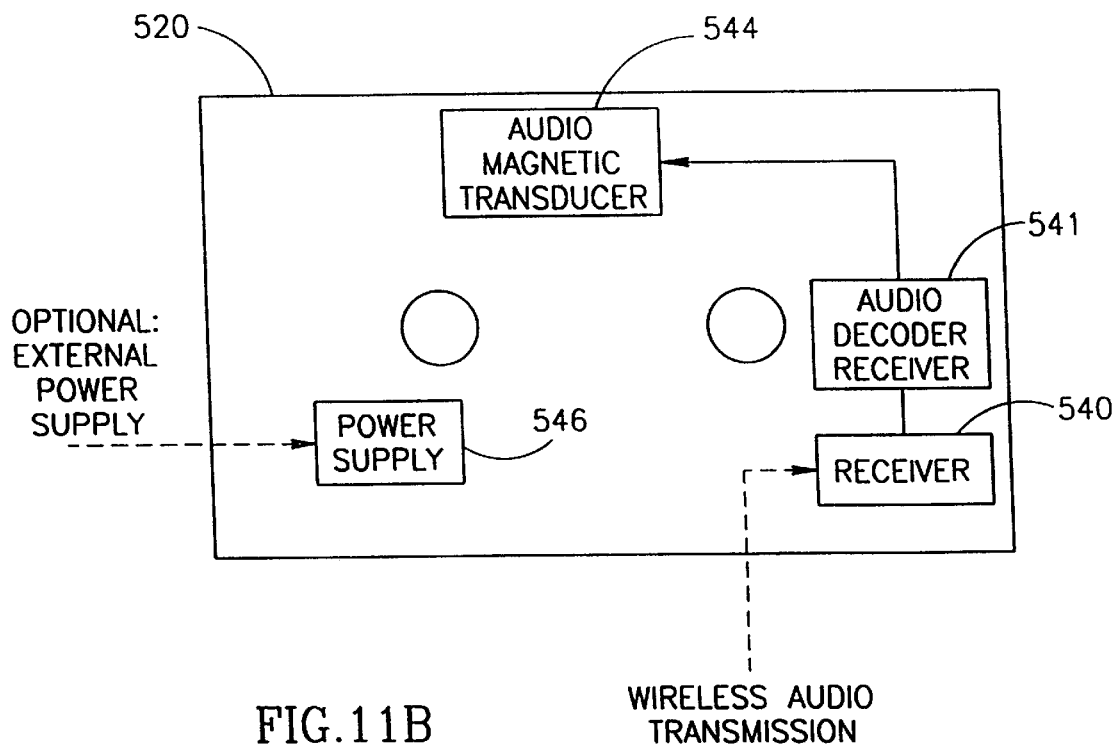
FIG. 11B is a schematic illustration of a wireless cassette adapter used with the embodiment of FIG. 11A.

Reference is now briefly made to FIGS. 11A and 11B. FIG. 11A schematically illustrates an embodiment of the vocal information system 500 of the present invention. FIG. 11B schematically illustrates the elements of a wireless cassette adapter 520 used with the vocal information system 500.

The embodiment of FIG. 11A illustrates the use of a wireless (RF) link between portable computer 512 and wireless cassette adapter 520 as well as a wireless link between portable computer 512 and remote controller 18.

The instructions from remote controller 18 can be received by a RF receiver such as model BC-NB, manufactured by Urel, Italy or model U4311, manufactured by TEMIC Telefunken Semiconductors of Germany, or as described with respect to RF receiver of the embodiment of FIGS. 2A and 2B. The received commands are then processed by portable computer 512 or by an internal PCMCIA Card 527. Similarly, the portable computer 512, or a PCMCIA card, can be used for the RF transmission of the audio output from the portable computer 512. The RF transmission, carrying the audio information, can be of analog modulation (AM or FM), or digital modulation, such as multiphase modulation implemented by PCMCIA Card 527.

The transmitter can be a Surface Acoustic Wave (SAW) resonator based FM transmitter, where the audio signal is fed to a Varactor diode which modulates the frequency of the oscillator in the tank circuit. The modulated RF signal is amplified by a transistor amplifier and is fed to an antenna.

Wireless cassette adapter 520 comprises a RF receiver 540, an audio decoder 541, audio to magnetic field transducer 544 and a power supply 546. Optionally, an external power source, such as a cigarette lighter 528 can be connected to power supply 546. The power supply 546, may contain a battery power pack.

The RF receiver 540, audio decoder 541 and amplifier (not shown) elements may be carried by the RF receiver model U4311, manufactured by Temic (using the quadrature decoder output), or by model TDA 7088T of Philips or others.

Audio decoder 541 converts the received signal from a portable computer 512 and passes the signal onto the audio transducer 544.

Audio to magnetic field transducer 544, which may be similar to audio transducer 98, as described hereinabove with respect to the embodiment of FIG. 2, enables the magnetic playback head of tape deck 522 to pick up the signal as though it was picked up from a magnetic tape.

Figure 12A:
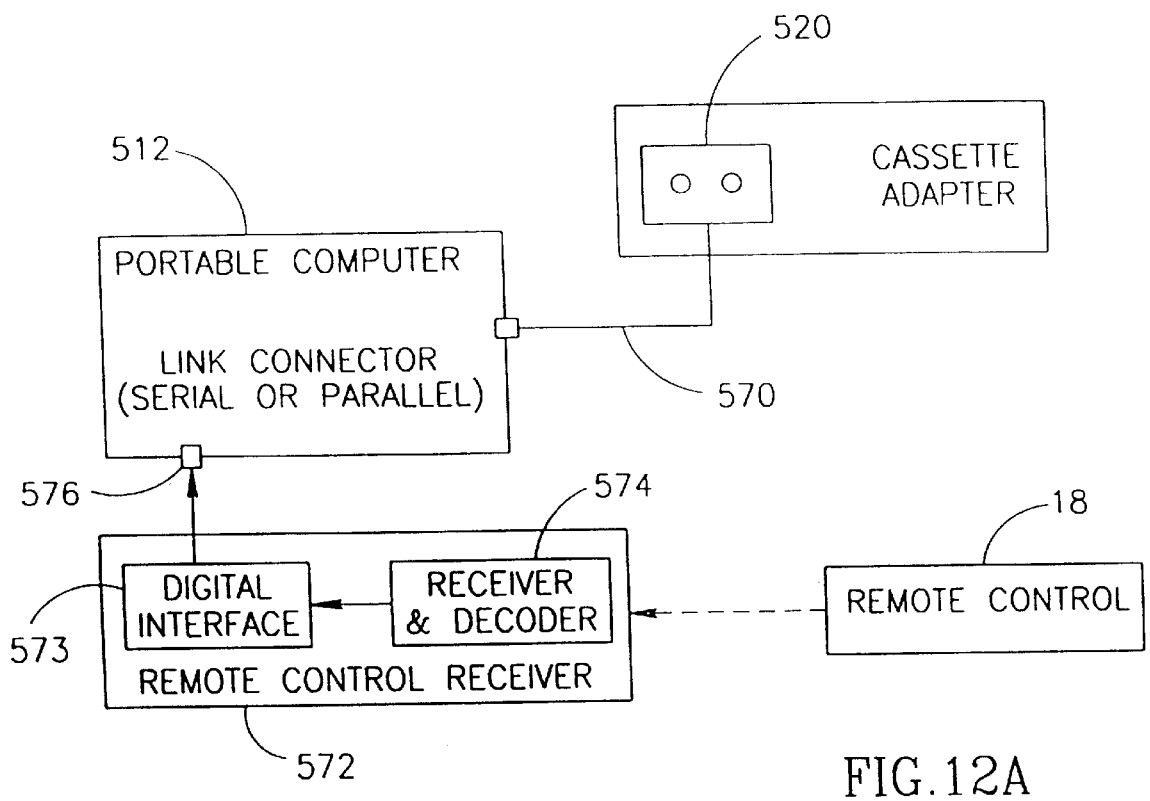
FIGS. 12A and 12B are schematic illustrations of two alternative arrangements of the vocal information system of FIG. 9.
Figure 12B:
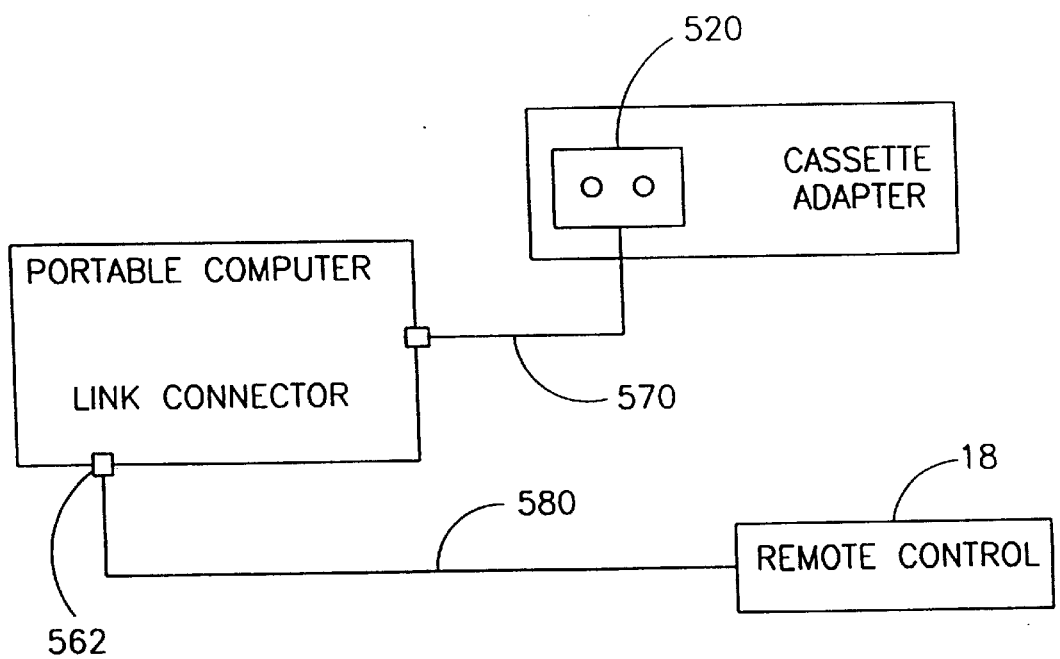

Reference is now briefly made to FIGS. 12A and 12B which illustrate alternative embodiments of the vocal information system 500 of the present invention. Both the embodiments of FIGS. 12A and 12B can be used with cassette adapter 520, of a type known in the art, such as ones described in U.S. Pat. Nos. 4,764,896 and 5,307,326. Elements having similar functions are designated with the same reference numerals.

In the embodiment of FIG. 12A, an electrical wire 570 connects portable computer 512 with cassette adapter 520. An external remote control receiver 572 is connected to portable computer 512. The remote control receiver 572 can be of a type known in the art, having, for example, a digital interface with the portable computer's communication port 576. The remote control receiver 572 comprises a receiver and decoder 574, similar to receiver and decoder 527 of FIG. 11A and a digital interface 573 such as PIC16C54 for linking to the portable computer port 576.

The communication port 576 may be a serial, mouse or parallel port or a PCMCIA slot.

The instructions received from remote controller 18 are processed by remote control receiver 572 before being passed onto portable computer 512. Portable computer 512, provides the audio signals, and transmits the audio signals to cassette adapter 520.

The embodiment of FIG. 12B is similar to the embodiment of FIG. 12A, except that in this case, remote controller 18 is also electrically wired (via wire 580) to a communication connector 562, such as a serial port of portable computer 512.

Figure 13A:
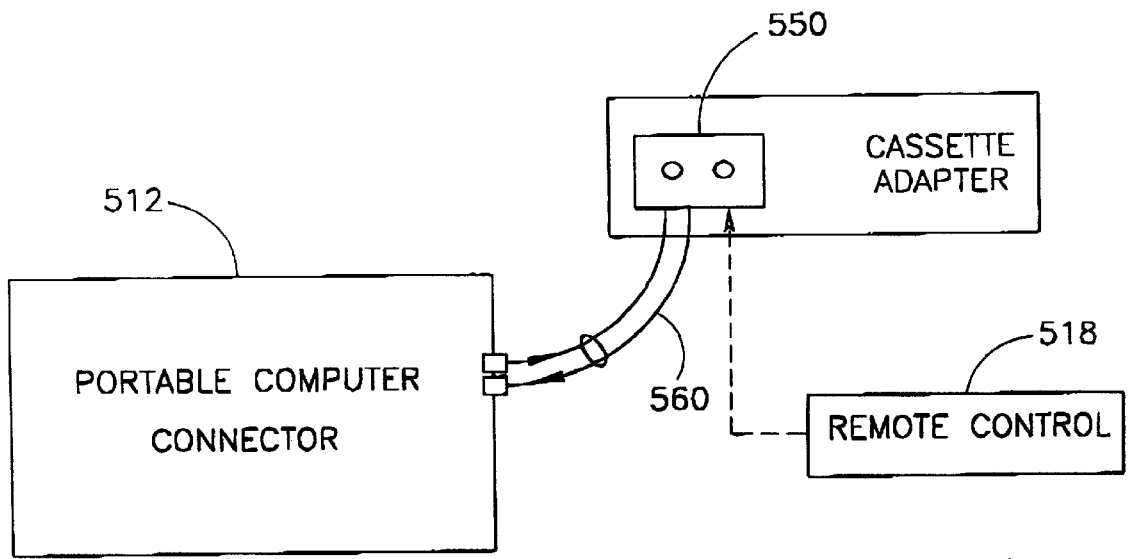
FIGS. 13A, 13B and 13C are schematic illustrations of three further arrangements of the vocal information system of FIG. 9.
Figure 13B:
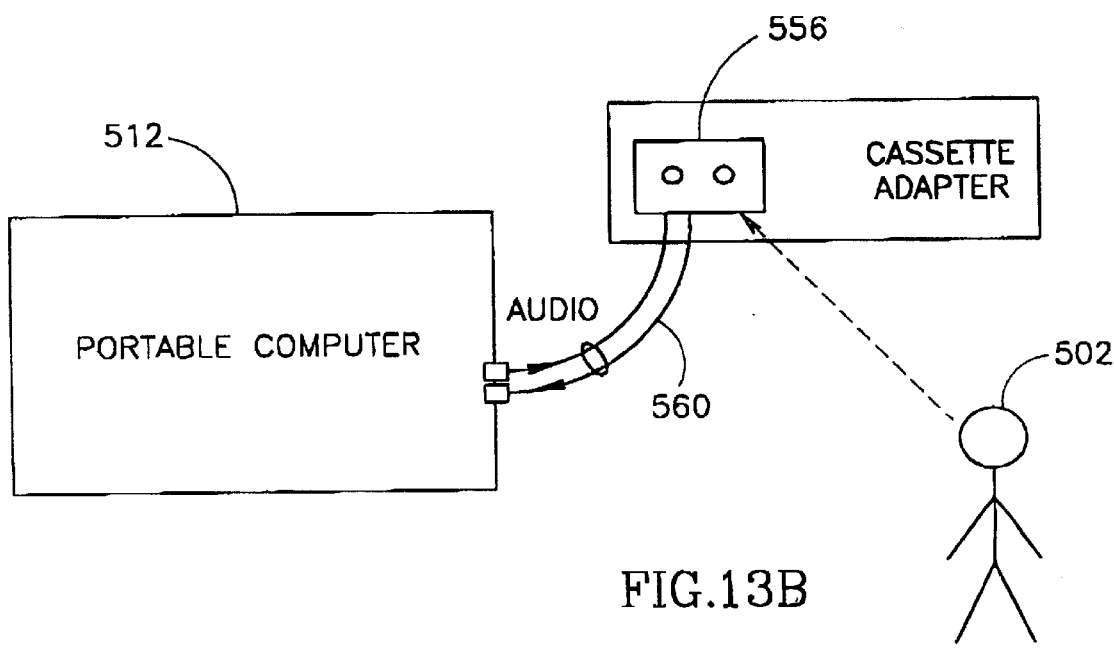
Figure 13C:
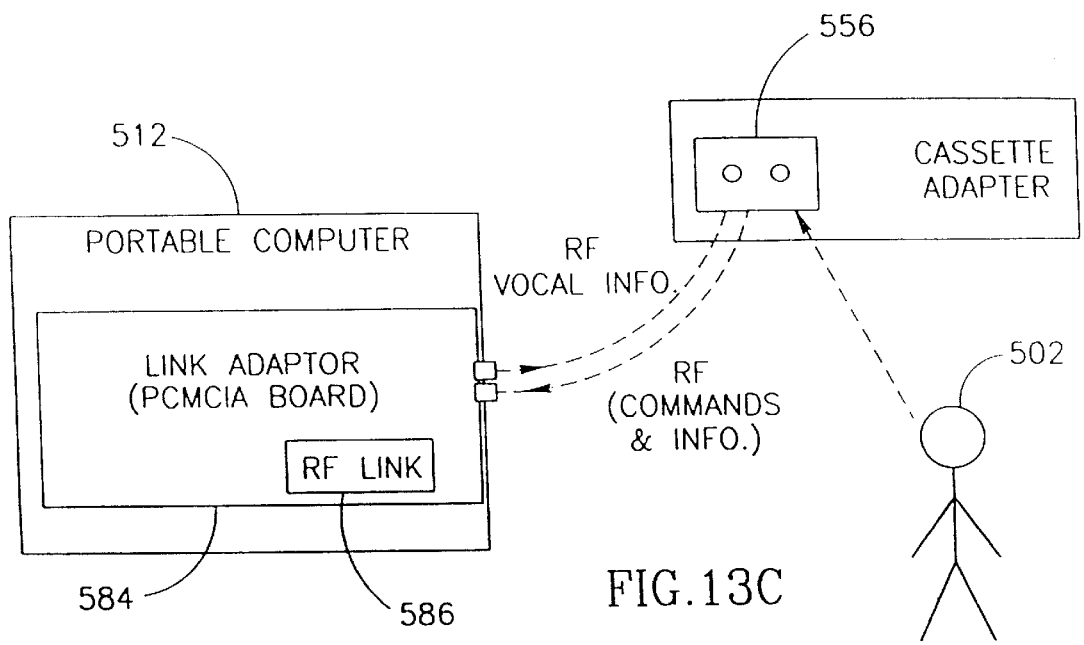
Figure 14C:
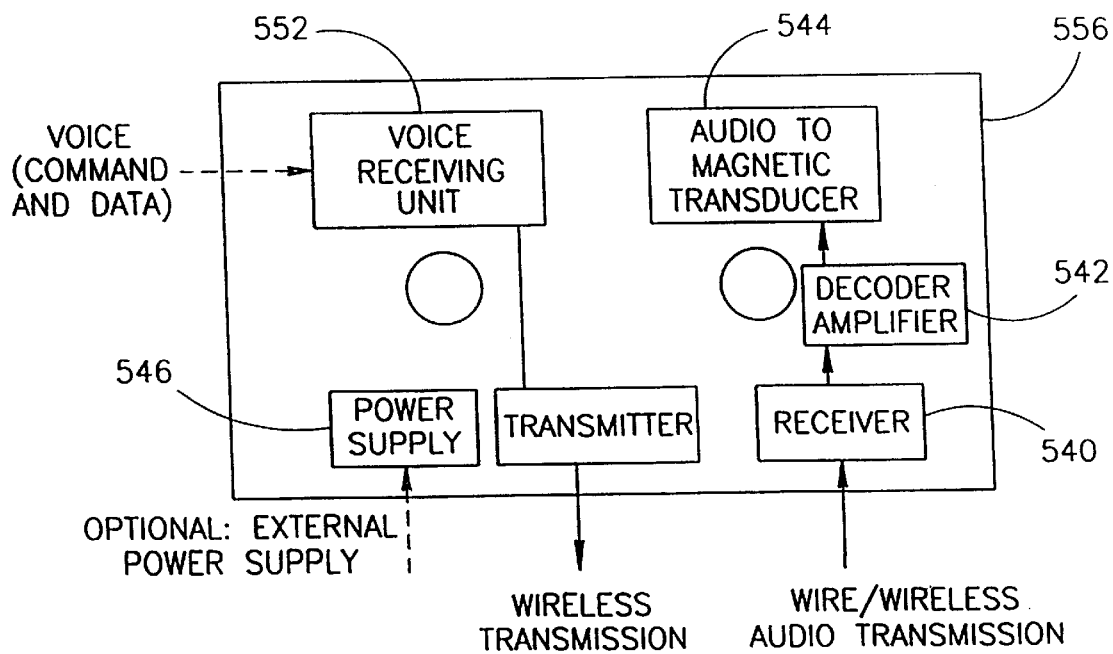
FIGS. 14A, 14B and 14C are schematic illustrations of a two-way cassette adapters used with the embodiments of FIGS. 13A, 13B and 13C.
Figure 14A:
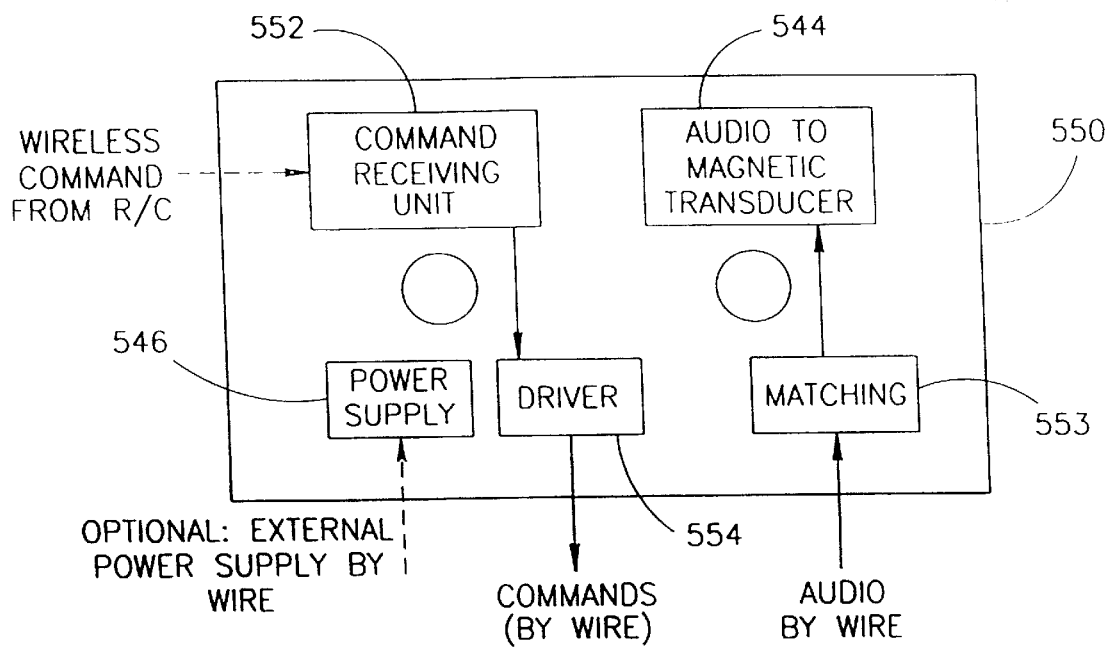
Figure 14B:
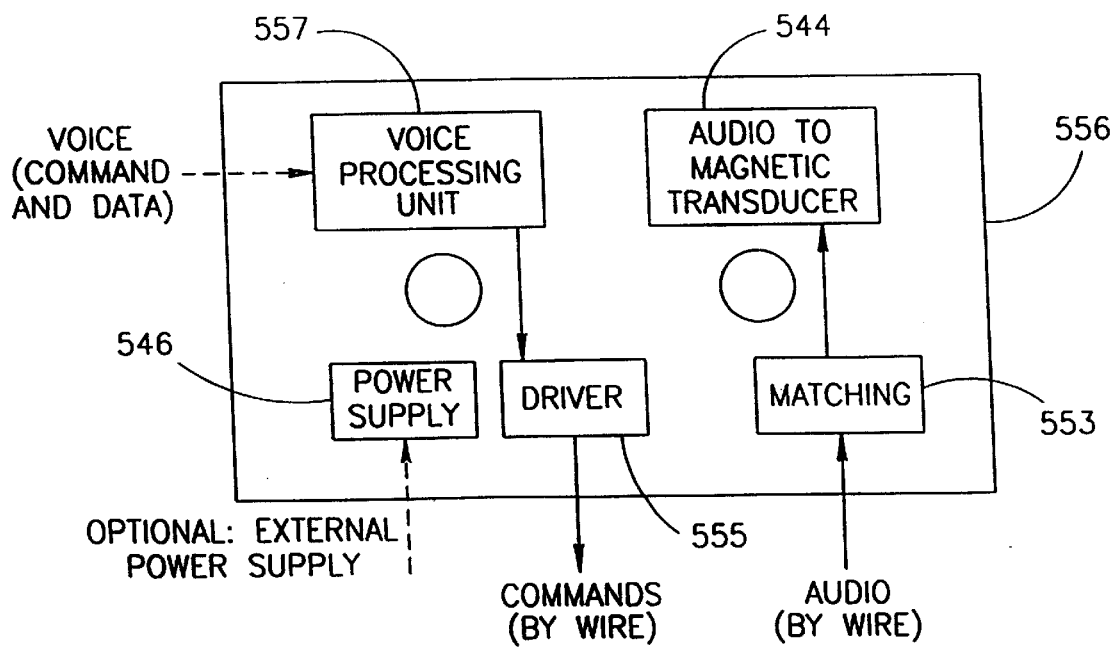

Reference is now briefly made to FIGS. 13A–13C and 14A–14C. FIGS. 13A–13C illustrate further alternative embodiments of the vocal information system 500 of the present invention. FIGS. 14A–14C schematically illustrate two-way cassette adapters 550 which can be used with the embodiments of FIGS. 13A–13C, respectively. Elements having similar functions are designated with the same reference numerals.

In the embodiment of FIGS. 13A and 14A, portable computer 512 is electrically wired (with wire 560) to two-way cassette adapter 550. Remote controller 18 communicates via a wireless (or wired) link with two-way cassette adapter 550 and through two-way cassette adapter 550 with portable computer 512.

Cassette adapter 550 is similar to cassette adapter 520, as described hereinabove with respect to the embodiment of FIG. 11B, and comprises matching circuitry 553, audio to magnetic field transducer 544 and a power supply 546.

Matching circuitry 553, matches the impedance of magnetic transducer 544. Additionally, cassette adapter 550 comprises a remote command receiving and processing unit 552 and a driver 554, for sending the command to the portable computer.

The remote command receiving and processing unit 552 receives and decodes the remote control signals, received from the remote controller 518. This unit 552 is similar to the remote control receiver 572 of FIG. 12A. The commands are passed to a driver 554 which enables the processed commands to be sent, via electrical wire 560, to portable computer 512. The audio output from the portable computer 512 is connected via electrical wire 560 to the magnetic transducer 544, via impedance matching 553, as described hereinabove.

In the embodiment of FIG. 13B, the user 502 uses voice commands to instruct the portable computer 512 which is electrically wired (via wire 560) to cassette adapter 556 (FIG. 14B). The audio output from the portable computer 512 is connected to a magnetic transducer 544, via impedance matching 553, as described hereinabove with respect to the cassette adapter 550 of FIG. 14A.

The voice commands of the user 502 are picked up by a voice receiving unit 557 which converts the voice to voltage, amplifies it and then passes it via an analog driver 555 to the input audio connector of the portable PC. The signal is converted to digital format and, by using voice recognition algorithms, decodes the user voice command. An example of suitable voice recognition algorithms are those supplied by ART Advanced Recognition Technologies Inc., of California, USA. The decoded commands are then used to navigate through the vocal information stored in the portable computer. This voice channel can be used, for example, for storing vocal memos and retrieving phone numbers from an electronic phone book stored in the a portable computer 512.

The embodiment of FIGS. 13C and 14C is similar to the embodiment of FIGS. 13B and 14B, except that the link between the cassette adaptor 556 and the portable computer 512 is a wireless RF link. The link adaptor 584 contains RF transceiver 586 for sending audio information to the cassette adapter 556 and for receiving navigation commands to and from cassette adapter 556. The link adapter 584 preferably comprises the audio system and the RF link 586. Alternatively, it is used as an RF adapter between the audio system and the cassette adapter 556.

Figure 14D:
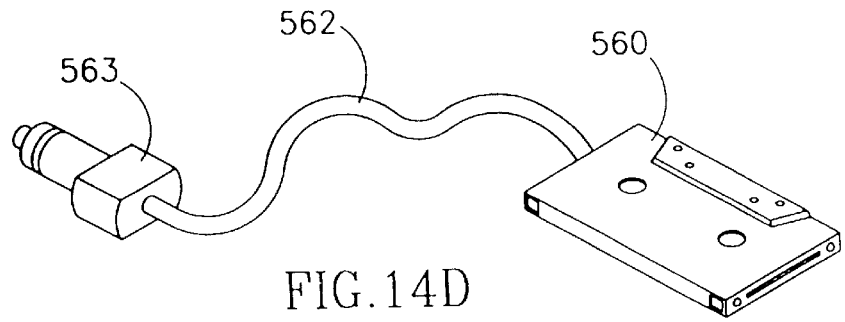
FIGS. 14D, 14E and 14F are schematic illustrations of a cassette which receives command signals along its power cable.
Figure 14E:
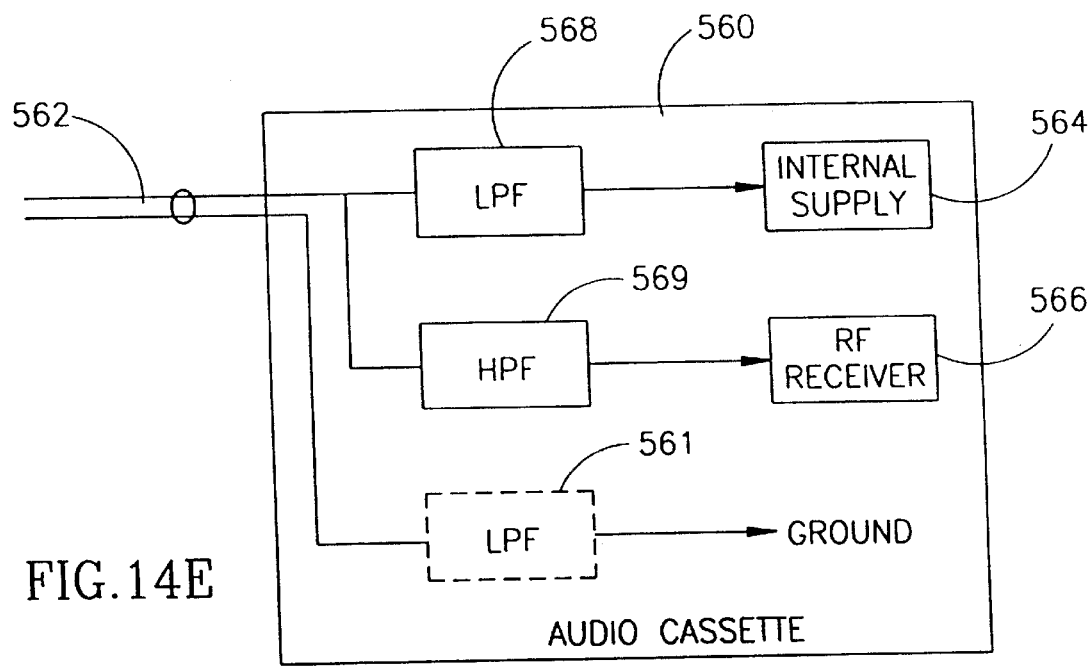
Figure 14F:
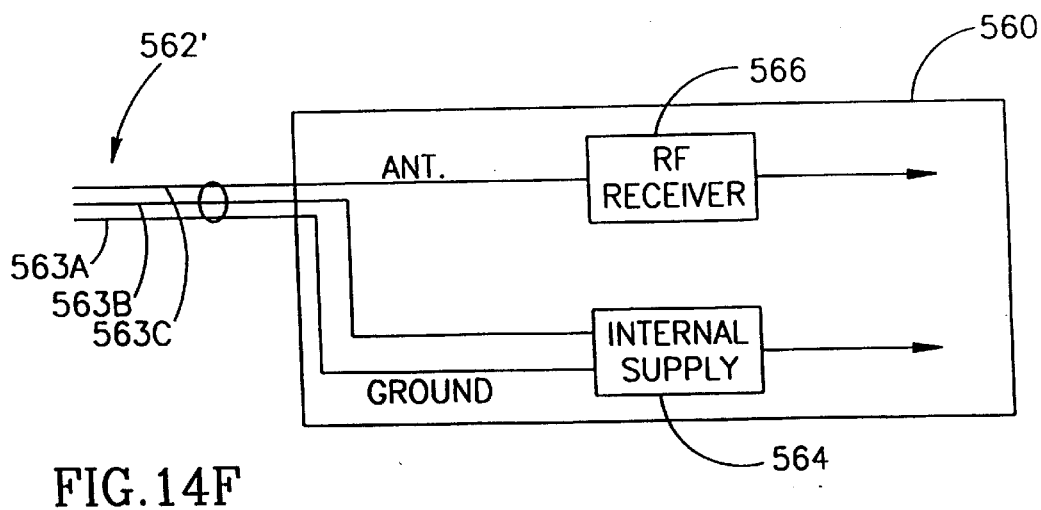

Reference is now made to FIGS. 14D, 14E and 14F which illustrate an audio cassette whose power cable also acts as an antenna for receiving commands from the remote controller. The audio cassette, labeled 560, is connected, via cable 562, to a cigarette lighter connector 563. Since the cable 562 is reasonably long, it can act as an antenna.

Thus, as shown in FIG. 14E, the signals carried by the power cable 562 are provided both to an internal supply 564 (similar or equivalent to supply 60 (FIG. 2A)) and to an RF receiver 566 (similar or equivalent to receiver 70 (FIG. 2A)). Because the signals carried by the power cable 562 include both power and radio frequency signals received by the cable when it acts as an antenna, the signals are first filtered by the appropriate low pass or high pass filter 568 or 569, respectively. Each filter removes the non-desired signals; thus, low pass filter 568 removes the RF remote control commands and high pass filter 569 removes the direct current power supply signals.

FIG. 14E also indicates that one of the wires of cable 562 is connected to a ground terminal, with an optional low pass filter 561 prior to the terminal.

Alternatively, and as illustrated in FIG. 14F, the cable, labeled 562', can have three wires 563, two (563a and 563b) for providing the power and a third (563c) to act as the antenna. In this embodiment, wire 563c is connected directly to the RF receiver 566 and the two wires 563a and 563b are connected directly to the internal supply 564.

Figure 23A:
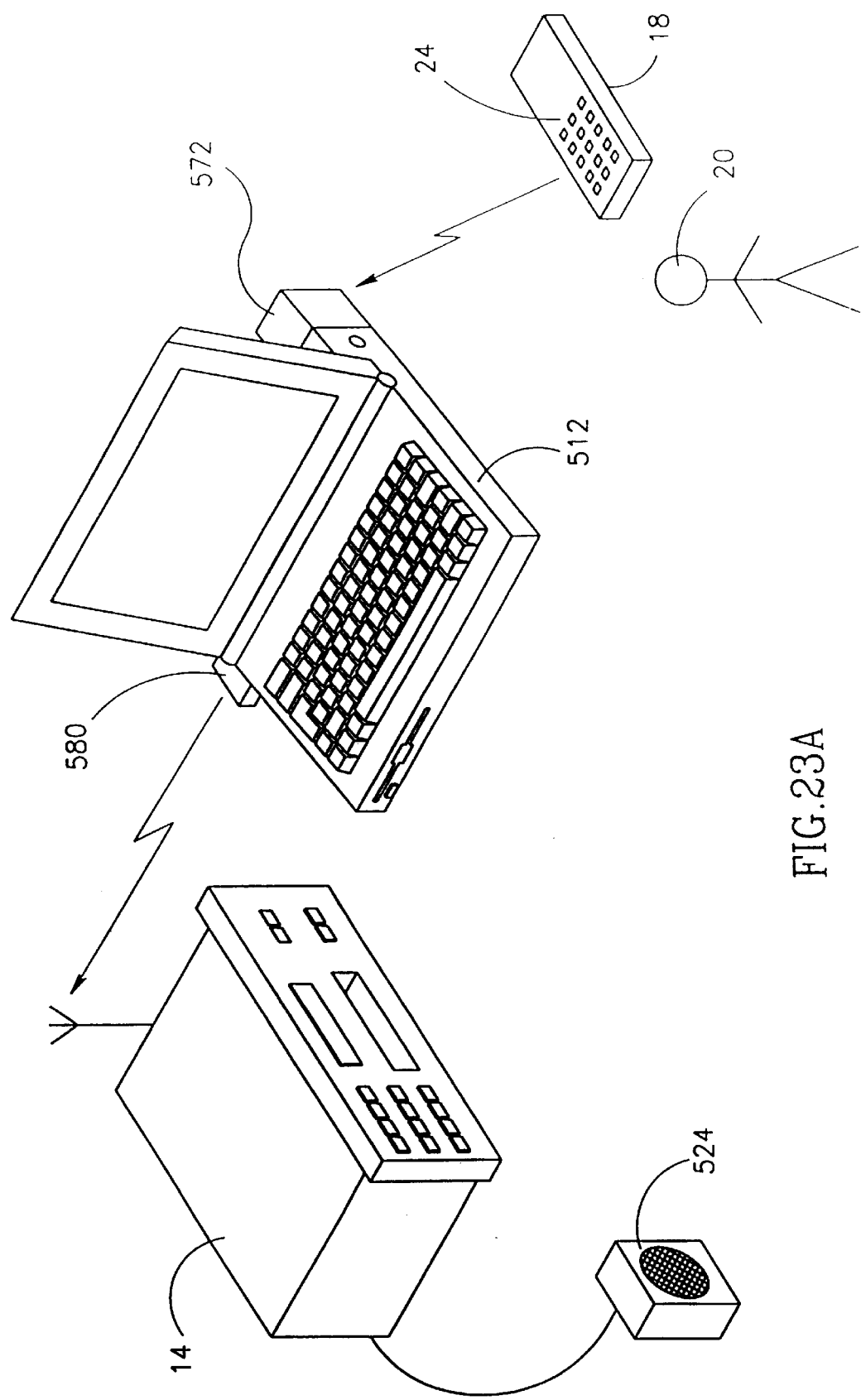
FIG. 23A is a schematic illustration of a further arrangement of the vocal information system of FIG. 9.
Figure 23B:
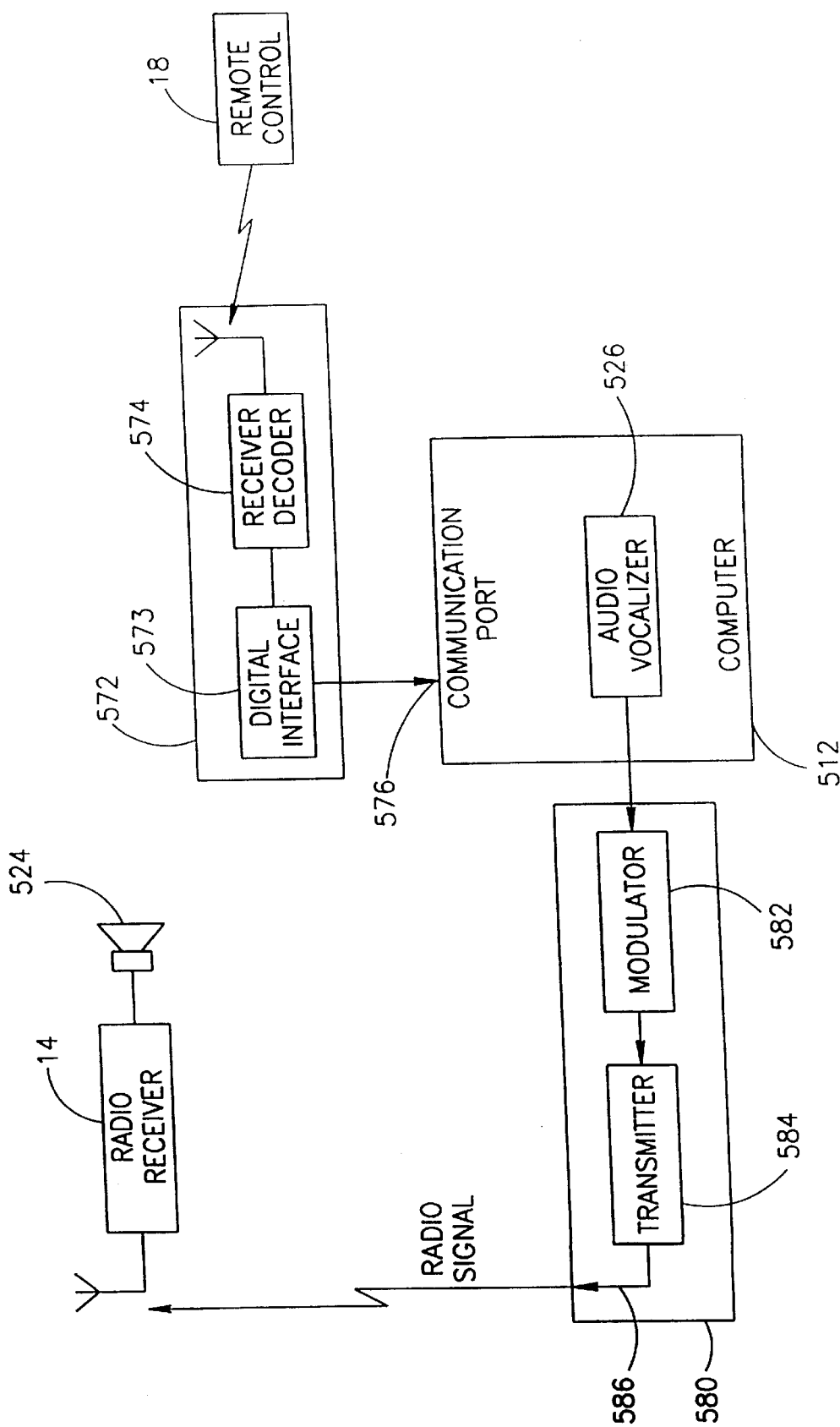
FIG. 23B is a block diagram illustration of the embodiment of FIG. 23A.

Reference is now briefly made to FIGS. 23A and 23B which illustrate an alternative embodiment of the vocal information system 500 of the present invention. Elements having similar functions are designated with the same reference numerals.

FIG. 23A schematically illustrates a vocal information system comprising a computer 512, radio receiver 14, loudspeaker 524 and remote controller 18. The user 20 controls the operation of the system by pressing selected keys on keypad 24 on the remote controller 18.

The wireless remote controller 18 transmits the commands to a remote control receiver 572 connected to computer 512. Computer 512 retrieves information according to the user's commands and converts the information to an audio signal which is then transmitted via an audio transmitter 580 to radio receiver 14. Radio receiver 14 decodes the audio signal to output audio acoustic waves via loudspeaker 524.

Reference is now briefly made to FIG. 23B which is a block diagram of the embodiment of FIG. 23A. Remote controller 18 is as described hereinabove with respect to FIG. 4, remote control receiver 572 is as described hereinabove with respect to FIG. 12A and computer 512 is as described hereinabove with respect to FIG. 9. The audio signal from computer 512 is sent to audio transmitter 580. Audio transmitter 580 includes a modulator 582 which modulates the RF signal to be transmitted by the RF transmitter 584. RF transmitter 584 transmits a radio signal, via antenna 586, using the radio receiver's frequency band. Radio receiver 14 receives the signal, amplifies it, decodes the audio, amplifies it and outputs it to loudspeaker 524.

Figure 15:
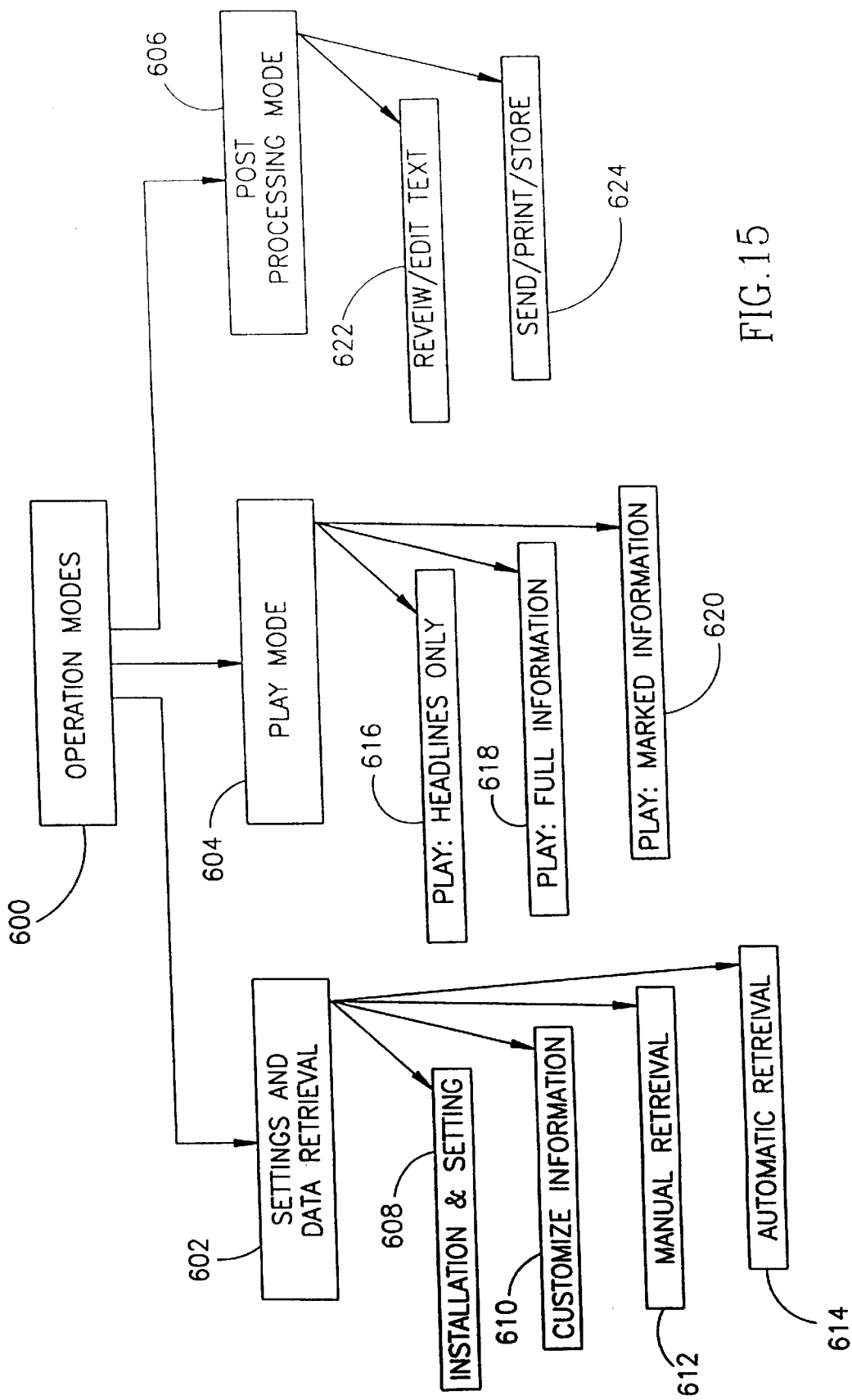
FIG. 15 is a flow chart illustration of the preferred operational modes of the vocal information system of FIG. 9.

Reference is now made to FIG. 15 which is a flow chart illustration of the preferred operational modes, generally designated 600, of the vocal information system. There are three main modes of operation; "Settings and Data Retrieval" mode 602; "Play mode" 604 and "Post Processing" mode 606.

Settings and Data Retrieval mode 602 enables the user to install the software, setup the system parameters and download information from the information center 510. Play Mode 604 enables the user to interactively listen to digital vocal information which has been stored in the computer's memory. Post Processing mode 606 enables the user to review the information in a textual format.

Selecting "Settings and Data Retrieval" mode 602 presents the user with a choice of four menu items; "installation and settings" 608, "customize information" 610, "manual retrieval" 612 and "automatic retrieval" 614.

"Installation and settings" 608 is used to install the program and setup the various parameters, such as user identification, password and modem definition and properties.

"Customize information" 610 enables the user to customize the keyword keys, for example, for use during browsing and searching for information and for downloading. The user can define the limits of information which may be downloaded from the information center, communication parameters, such as the number of retries for communicating with the information center and the time for downloading.

The user may select either manual downloading (manual retrieve 612) or automatic retrieval 614 in order to download data from the information center 510. Manual retrieval 612 is used for manual communication with the information center and requires the user to perform each step of the communication process each time he wishes to log on. Thus, he manually enters his identification, selects the information to be downloaded, waits for the downloading to be completed and then disconnects himself from the network.

The user can perform automatic downloading session by choosing the "Automatic Retrieval" 614 option, in which case all downloading operations, as described hereinabove for manual retrieval, are automatically performed by the user's computer using the software package associated with the present invention.

Alternatively, the user's computer may be set up as a host computer, ready to download digital vocal information from the information center 510. The information center 510 initiates all operations by dialing the user's telephone number and, after confirming the communication, downloading the digital vocal information to the user's computer's memory. The digital vocal information comprises both voice and textual data.

The user may select one of several playing modes from the play mode 604 menu. The user has a choice of playing either "Headlines only" 616; "Full information" 618 or "Marked information" 620.

When "Headlines only" 616 is selected, the vocal system only plays the headlines of the information segments stored in the memory. The user may also select from a plurality of play control options, described in further detail hereinbelow, which allows him to play and mark the full text.

"Full information" 618 is selected to play all the information segments. The default playing mode is sequential. However, the user may control the order of playing, described in further detail hereinbelow. The user may also mark information segments for printing or reviewing at a later stage.

When "Marked Information" is selected, the vocal information system will sequentially play all the marked information segments. The user may control the order of playing.

"Post Processing" mode 606 enables the user to retrieve marked information segments or any other information stored in the computer's memory. The user can edit the information, delete or add text of his own (option 622). The user can store, print or send data (option 624).

It will be appreciated that both textual and vocal (audio) information can be stored in the database. The audio information typically is the voiced versions of the textual information. Thus, the audio information is played and the associated textual information is available for printing, if marked.

Figure 16:
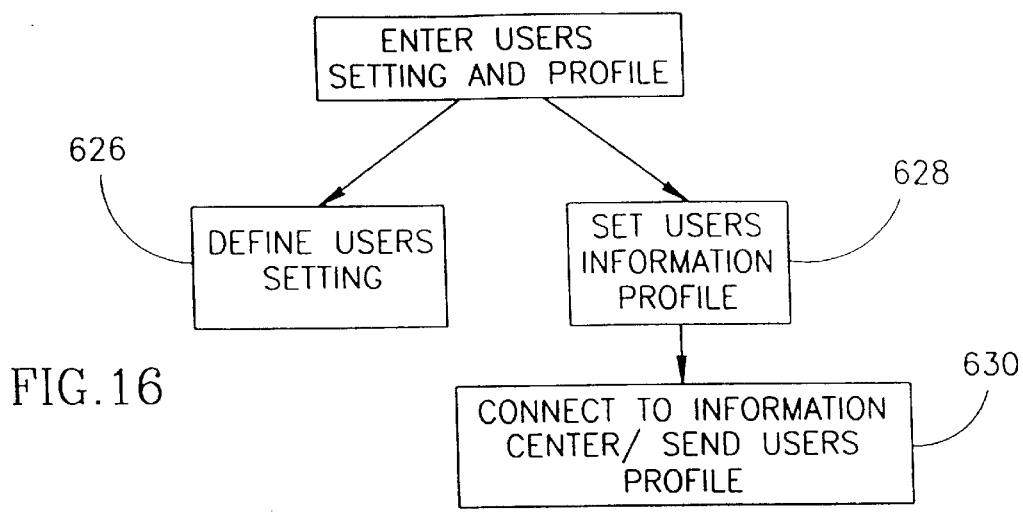
FIG. 16 is a detailed illustration of the vocal information system settings.

Reference is now made to FIG. 16, which illustrates in greater detail the options available when the "Installation and settings" 608 menu is selected. The user may select "User Settings" 626 or "Information Profile Setting" 628.

"User Settings" 626 enables the user to enter his personal identification parameters, such as name and password, the access script being used, the information provider's telephone number, network address and maximum connection retries.

"User information profile" 628 contains information for determining and characterizing the information to be retrieved from the information center, such as the source of information, subject matter and maximum size of the information to be downloaded. The user may send his information profile (step 630) to the information center 510.

Figure 17:
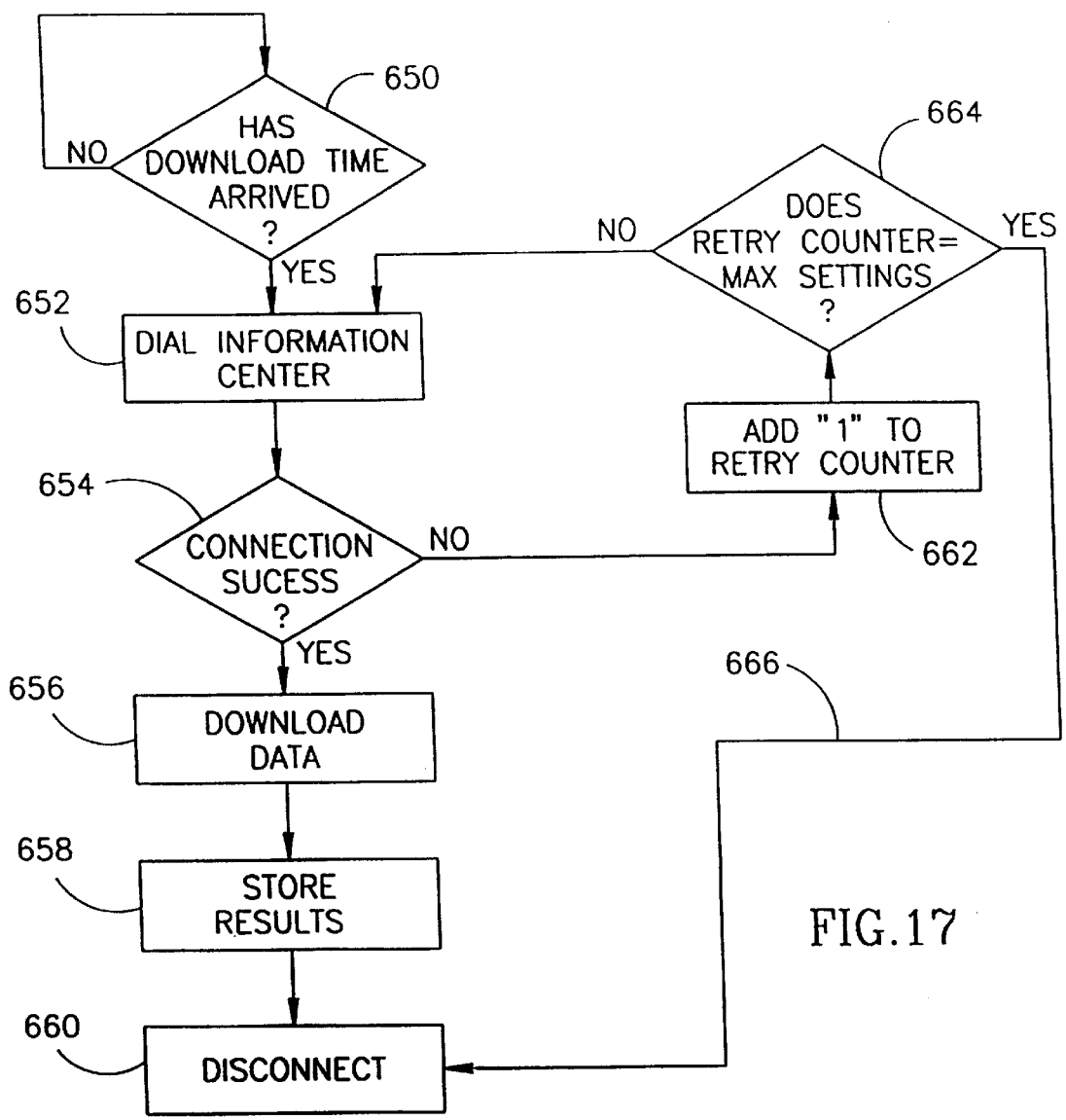
FIG. 17 is a flow chart illustration of the automatic information downloading process vocal information system of FIG. 9.

Reference is now made to FIG. 17 which is a flow chart illustration of the automatic information downloading process. At the time specified for downloading (step 650), the computer initiates the download procedure time by dialing the information center 510 and using the prepared access script (step 652). The computer checks whether the connection is successful (step 654). If connection has been made, the computer requests the information specified in the user profile (step 656). The data is stored (step 658) and the computer disconnects from the network and telephone line (step 660).

If the connection has failed, the software checks how many false connections has occurred, adds one to the retry counter (step 662) and if the number of retries is less then specified in the user setup file, the software waits and redials (step 664). If there were too many false connections, the connection process is terminated with a message indicating the problem (step 666).

Figure 18:
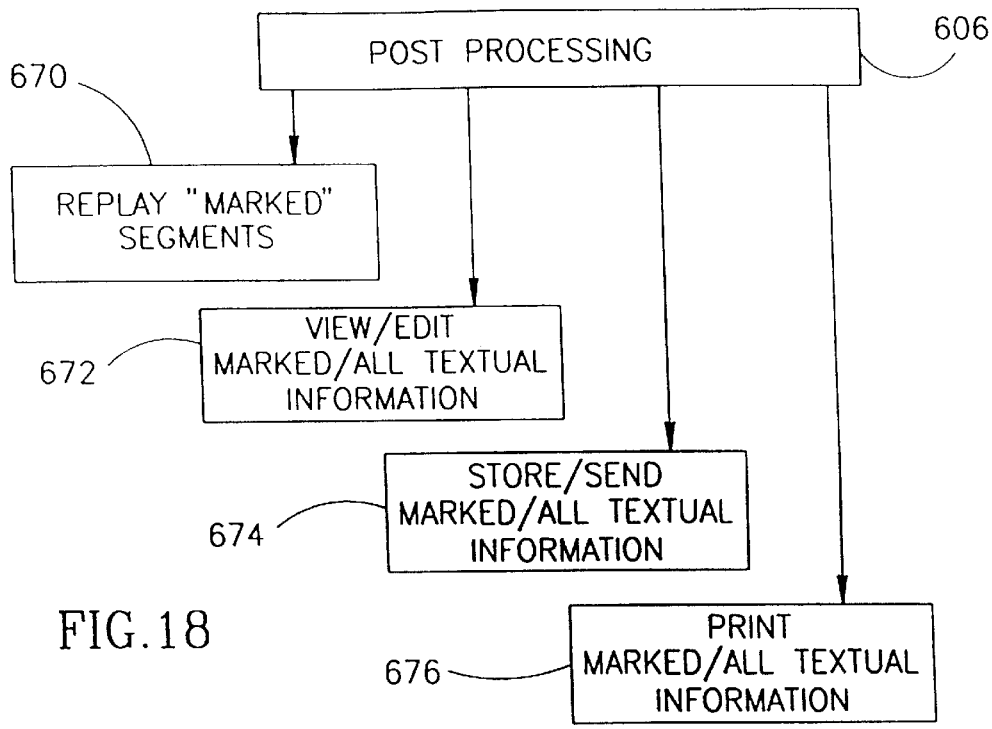
FIG. 18 is a functional block diagram illustration of the post processing mode vocal information system of FIG. 9.

Reference is now briefly made to FIG. 18 which illustrates, in a functional block diagram, the functions available if the Post Processing mode 606 is selected. The Post Processing mode enables the user to manipulate the previously marked segments of information.

Segments which were marked during play mode 604, can be replayed (670), viewed and edited (672). The viewing/editing 672 function can also be used on any part of the information data base as well as the marked information segments.

The textual information can be stored or onwardly transmitted (674) via modem, for example to another computer. Additionally, a hard copy of the marked segments or any other segments of information may be printed (676).

Figure 19:
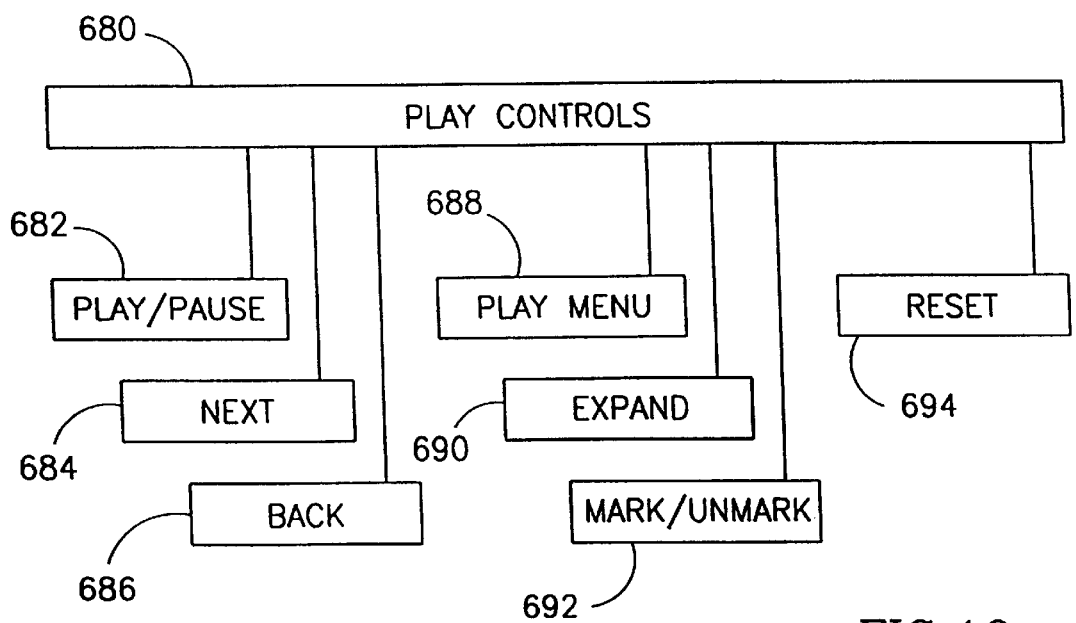
FIG. 19 is a block diagram illustration of the play modes of the vocal information system of FIG. 9.

Reference is now made to FIG. 19 which illustrates the preferred controls 680, operative when Play Mode 604 is selected. As described with respect to FIG. 15, Play Mode 604 allows the user to play either the fill text, headlines or marked text according to choice. The commands available in Play Mode 604 are designated "Play/Pause" toggle 682, "Next" 684, "BACK" 686, "Play Menu" 688, "Expand" 690, "Mark/Unmark" toggle 692 and "Reset" 694.

The "Play/Pause" 682 key acts as a toggle key. Generally, pressing the "Play" key 682 starts playing the vocal information from the last position stopped. After initialization, "Play" 682 plays the information from the beginning.

By pressing the "Play/Pause" 682 toggle key during play, the playing will be paused until the pause key 682 is pressed again.

The "Next" key 684 stops playing the current information item and skips to the next information item. The operation is context sensitive. If the current information is the information sections vocal menu, the "Next" key 684 will stop playing the current section item, skip to the next section menu item and play that instead. Pressing the "Next" key 684 during playing "Headline" or "Full", will cause the next "Headline" to be played. The "Back" key 686 causes the playing of the previous item.

The "Play Menu" 688 command causes the software to stop its current operation, skip to the vocal menu and play the next item in the menu.

Pressing the "Expand" key 690 while playing a section menu item, will cause the headline of the first information item of the section to be played after the section item has been completed. Pressing the "Expand" key 690 while playing a headline will play the full content of that information segment after the headline has been completed. At the end of playing the full information segment, the software continues playing headlines only, unless another command is received.

The "Mark/Unmark" toggle key 692 flags the information segment of interest to the user. Pressing the key once "flags" the information segment being played as of interest to the user. Pressing the key (which has already marked a section) will "unflag" or remove the mark flag from the segment. Thus, the user can mark segments for later processing.

The "Reset" 694 command replays the information segments from the beginning.

Figure 20:
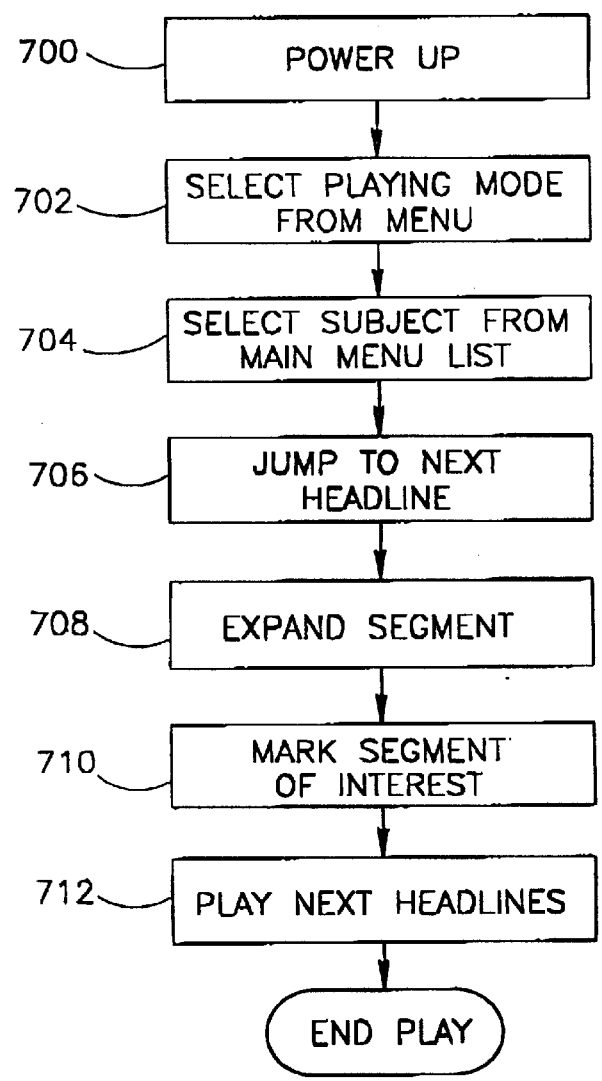
FIG. 20 is a flow diagram illustration of a typical sequence of operations for the audio system.

Reference is now made to FIG. 20 which is a flow diagram which illustrates a typical sequence of operations for the audio system using the play controls, described hereinabove with respect to FIG. 19.

After power up (step 700), the user is presented with a menu ("headlines only", "headlines and abstracts" or "full information"). Using the mark key, he selects the desired playing mode (step 702), for example, "headlines only". Alternatively this selection can be made by a direct command from the remote controller.

A main vocal menu list of available subjects, such as news, business and sports items is then presented to the user. The user can use the play controls such as Next 684 and Back 686, described above with respect to FIG. 19, to move between the items listed. The item of interest is selected (step 704) by using the "Expand" command 690. For example, if the user selects "business news", the headlines of all these items will be played consecutively. While listening to a headline (for example, headline 3), the user presses "next" 684 (step 706), the system jumps to the next item (headline 4) and starts playing that headline. The user then presses the "expand" key 690 (step 708) while listening to a headline in order to listen to the complete information item. The user marks a segment of interest to him using the "mark" key (step 710). The next headlines are then played (step 712)

The information headlines continue to be played consecutively, until the end of the section or until a command is given to the system, after which the system returns to the main-menu list.

Figure 22:
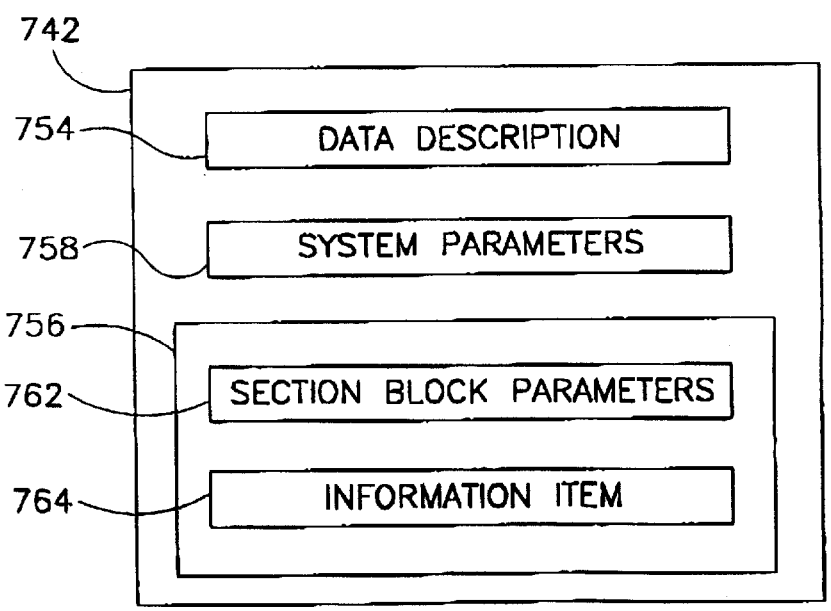
FIGS. 21 and 22 are block diagram illustrations of the data base structure.
Figure 21:
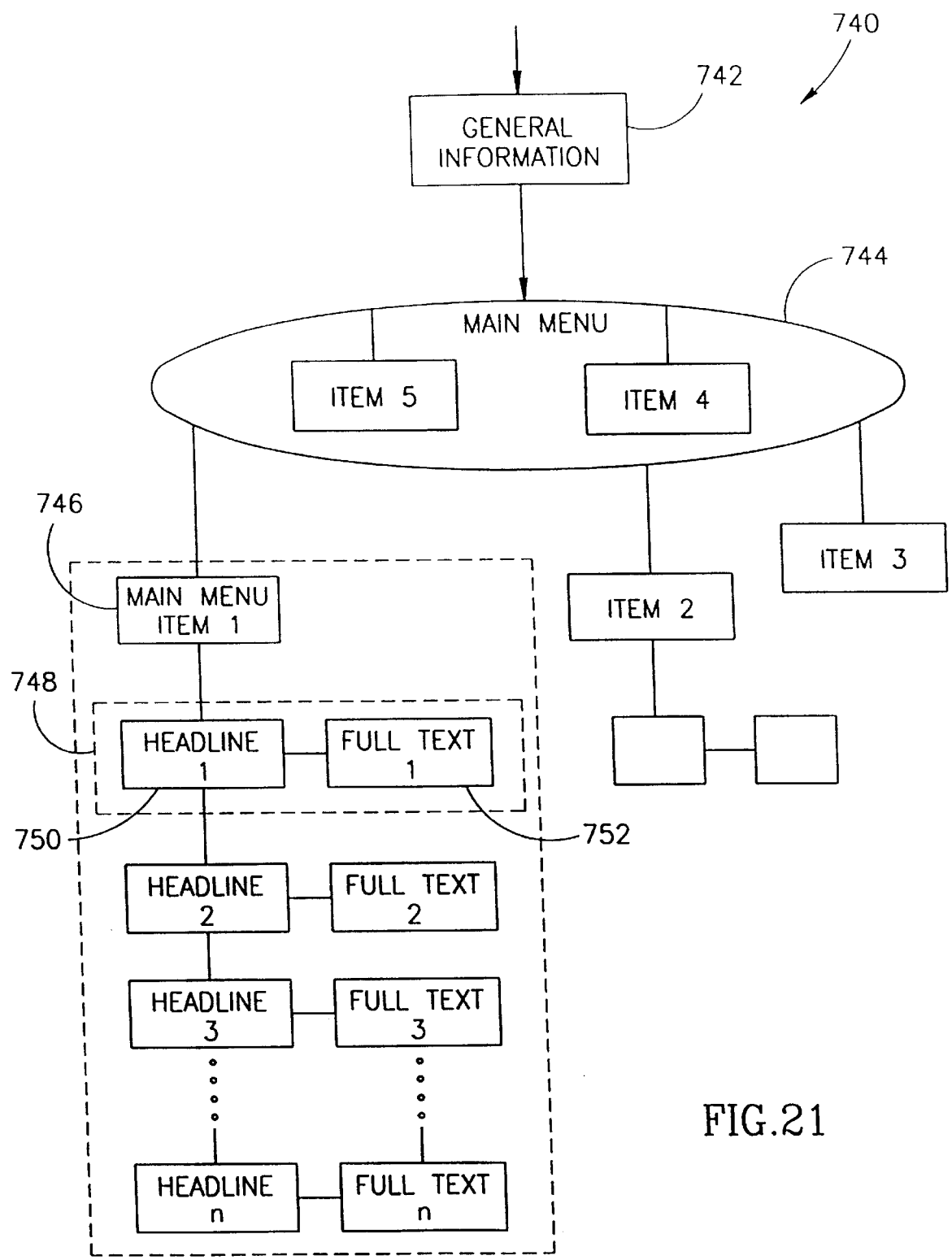

Reference is now briefly made to FIGS. 21 and 22 which are block diagram illustrations of the preferred logical structure of the compounded data base used for the storage of information items. The data base 740 has a tree structure containing link indexes and pointers. Data base 740 comprises a general information block 742, containing information about the data base 740 and a plurality of sections 744. Each section 744 is further subdivided into a section information block 746, containing the section description, and information item blocks 748. Each information item block 748 contains the item headline 750 and the full content of the information item 752.

The general information block 742 (FIG. 22) contains data description information 754, section information 756 and system parameters 758.

Data description information 754, includes data such as, data source, data date, data format, size of data, number of sections and compression parameters. The section information 756 contains data for each section, such as the section size, pointers to the section's text, section's voice, flags and variables.

System parameters 758 include data on the system status and system statistics, such as items used and duration of use and run time parameters such as pause pointer, last item played and mode of operation.

Each section information block 756 contains information about the section block itself 762 and the information item 764 within the block. The section information block 762 contains a description of the section, such as the section's parameters and variables including number of information items and pointers, the section's name in text and digital vocal forms. It may also contain background music.

Information item block 764 contains two sub-blocks; the item headline and the full item content.

The data base can be implemented as a relational data base. It will be appreciated that the present invention provides an audio system with the ability to browse through and mark, if desired, stored digital data and with the ability to download at least some of the stored digital data from the audio system for further processing.

Figure 25A:
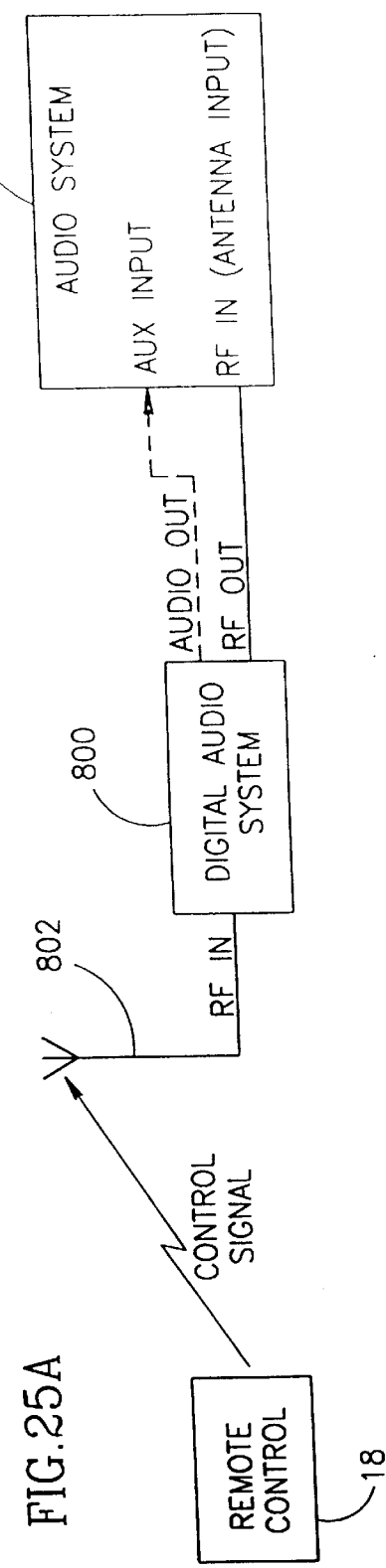
Figure 25B:
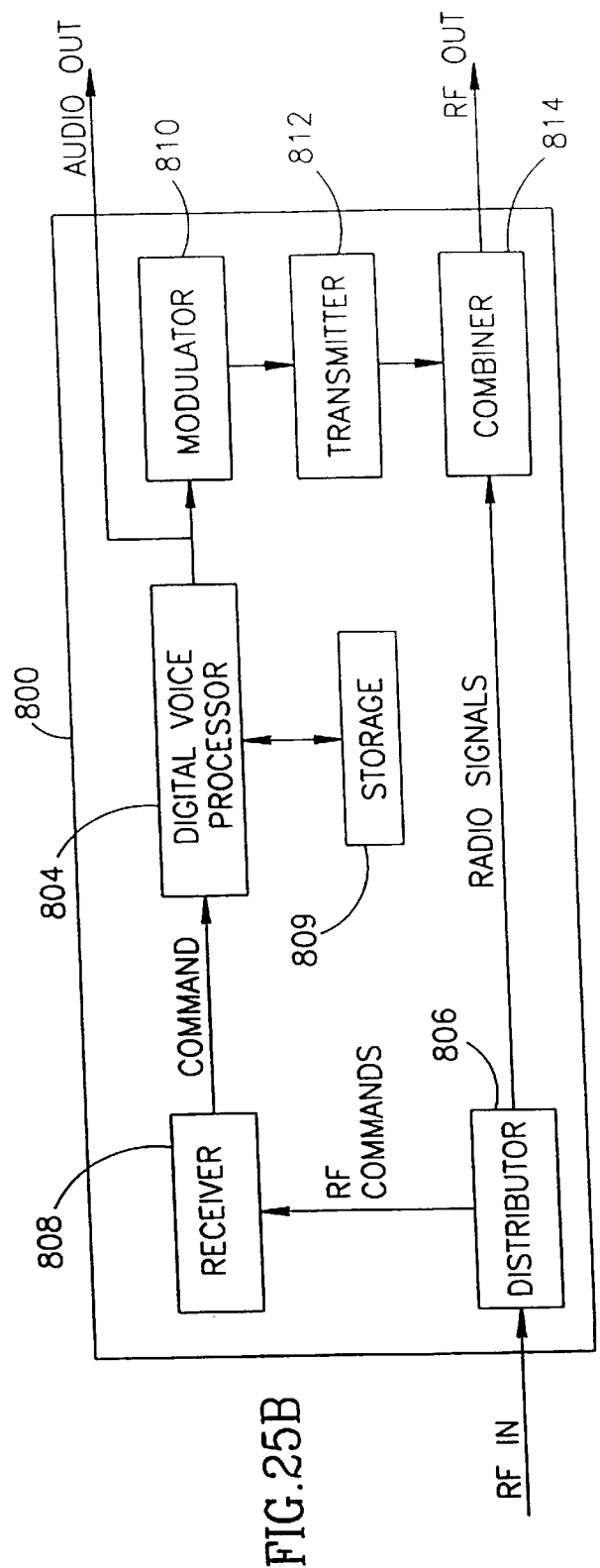

Reference is now made to FIGS. 25A and 25B which illustrate a further embodiment of the present invention. In this embodiment, a digital audio system 800 has an antenna 802 which receives RF signals from both radio stations and from the remote controller 18. As shown in FIG. 25B, the digital audio system 800 splits the signals, providing radio signals directly to the audio system 14 and providing the command signals to a digital voice processor 804, such as any of the voice information systems described hereinabove, for processing as described hereinabove to produce audio signals of the information to be heard.

The digital audio system 800 provides the radio signals to the audio system 14 to its RF IN input line and the audio signals to the AUX input line of the audio system 14. Alternatively, system 800 can modulate the audio signals, in the manner of a radio station, to create a further "radio station" channel which the audio system 14 can receive through its RF IN line.

The digital audio system 800 comprises a distributor 806, a receiver 808, the digital voice processor 804, a data storage module 809, a modulator 810, a transmitter 812 and a combiner 814. The distributor 806 provides the incoming RF signal to two destinations, the receiver 808 and the combiner 814.

Receiver 808 is similar to receiver 70 and is set to the frequency of the RF command signals. Receiver 808 converts the RF command signal to a digital command signal for the digital voice processor 804. Voice processor 804 utilizes the commands to select the audio information from storage 809 to be played. The audio information can then either be output directly to the AUX input line of the audio system or provided to the modulator 810 for modulation along a carrier frequency. The output of the modulator 810 is provided to transmitter 812 which operates to create a radio frequency (RF) signal from the modulated signal, amplifying the signal and matching impedance with the combiner 814. The RF signal is then combined with the other radio signals by combiner 814 and provided to the RF IN line of the audio system 14. The audio system 14 then can play the audio signals from the voice processor 804 when the "station" associated with the voice processor 804 has been selected.

It will be appreciated that the distributor 806, receiver 808, modulator 810, transmitter 812 and combiner 814 are well known elements in the radio art.

Reference is now made to FIGS. 25C and 25D which illustrate a further alternative embodiment of the present invention. The digital audio system 800a is similar to the system 800 but the receiver 808 is of dual use, a) for receiving the vocal and text database to be stored in storage 809 and b) for receiving the control signals. The stored data is played later by the digital voice processor 804 according to the commands received by the receiver 808. The modulator 810 and the transmitter 812 operate as in the previous embodiment, producing an RF signal of the audio signals to be played. The RF signals carrying the audio signals is then combined, by the combiner 814, with the RF signals from the radio stations (received by a second antenna 802a typically forming part of the audio system 14).

The receiver 808 can be similar to any of the receivers described hereinabove with the addition of a data pump, such as data pump 839 of FIG. 27B. The receiver can be a single receiver receiving the data and commands in time division multiplexed (TDM) format. If so, the database signals are received only when there are no command signals. Alternatively, the receiver 808 can be formed of two receivers, each receiving one of the data and the commands.

Alternatively, the digital audio system 800a can transmit, in the manner of a radio station, the output RF signals. The audio system 14 receives the radio station signals and the RF modulated audio signals with its own antenna 802b.

Figure 26A:
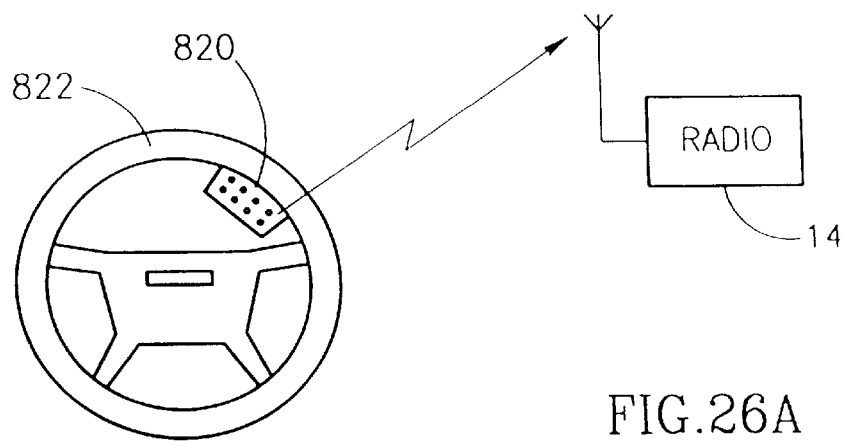
FIGS. 26A and 26B are illustrations of a steering wheel based embodiment.
Figure 26B:
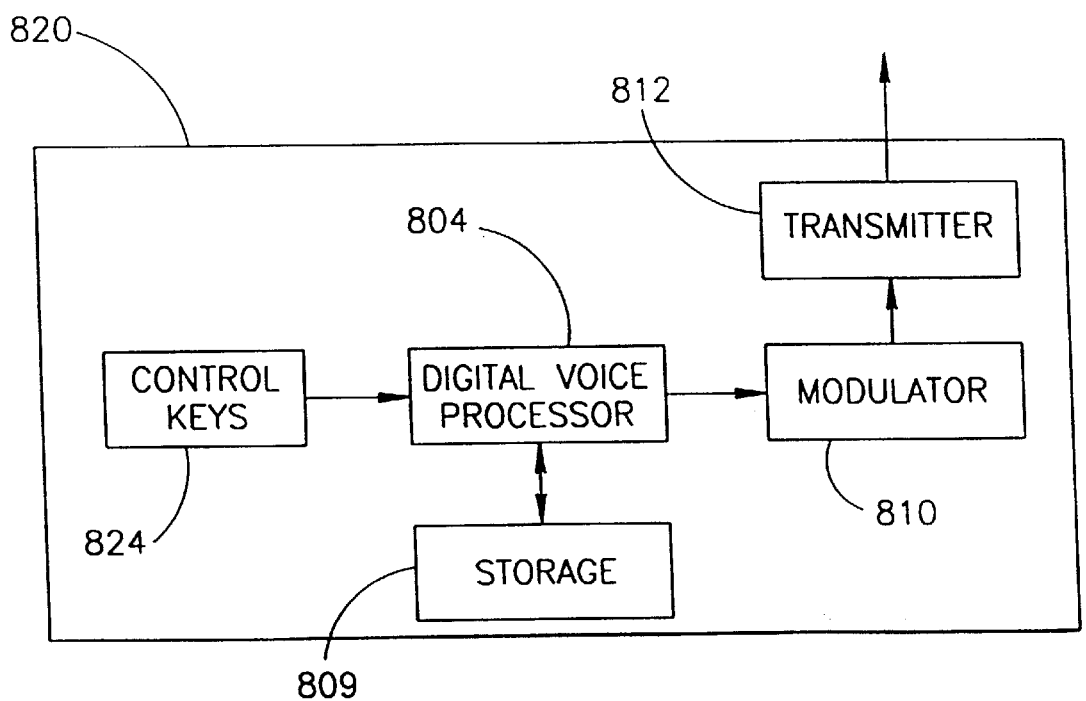

Reference is now made to FIGS. 26A and 26B which illustrate a further embodiment of the voice information system of the present invention, labeled 820, which is attachable to the steering wheel, labeled 822, of a car. As in the previous embodiment, the audio signals are transmitted to the audio system 14 as RF signals and can be selected by the user by selecting the associated radio channel. Thus, similar elements carry similar reference numerals.

In this embodiment and as shown in FIG. 26B, the control keys 824 are combined into the same unit as the digital voice processor 804. Thus, the commands for moving through the data stored in storage unit 809 are provided directly to the voice processor 804. Processor 804 outputs the audio signals related to the selected audio information which are then modulated in modulator 810 and transmitted to the audio system 14 via transmitter 812. The storage unit 809 can be solid state memory and can be built as a removable unit, such as is discussed hereinabove.

Reference is now made to FIGS. 27A, 27B and 27C which illustrate the vocal information system of the present invention as implemented in a cellular telephone 830. FIG. 27A illustrates the cellular telephone 830 having standard cellular telephone components as well as an extra button 832 providing access to the vocal information system. The present invention can also be implemented by providing a special combination of the standard buttons, found on keypad 833, to access the vocal information system.

As shown in FIG. 27B, the cellular telephone 830 includes the standard cellular circuitry 834, a modem chipset 839 including a digital signal processing element and a data pump, the standard audio amplifier 836, and the elements of the vocal information system, labeled 835, (i.e. bus 62, the digital input/output unit 52, the analog input/output unit 58, the processor 54 and the memory array 56). In regular cellular operation, the regular cellular circuitry 834 provides the voice signals to the audio amplifier 836, which provides the signals to the speaker 837, through which the user hears the voice signals.

When the user presses the extra button 832 or enters the special code through the keypad 833, the regular cellular circuitry 834 activates the vocal information system 835. From this point on, the user enters commands to the vocal information system 835 through the keypad 833 and the vocal information system 835 provides the audio information signals out through the audio amplifier 836 and the speaker 837.

The regular cellular circuitry 834 provides the keystroke information (i.e. the commands) to the digital input/output unit 52 which then passes them to the processor 54. The processor 54 selects the relevant audio information from the memory array 56 and provides the selected audio signals to the analog input/output unit is 58. In turn, unit 58 provides the audio signals to the audio amplifier 836 and, from there, to the speaker 837, through which the user hears the selected audio information.

The memory array 56 contains the vocal information database. It can be downloaded either via the telephone and modem circuitry of modem chipset 839, such as the AT&T HSM208 DSP core and the data pump of AT&T Microelectronics of Allentown, Pa., USA or by using the DSP and data pump typically forming part of the cellular telephone circuitry 834. Alternatively, the vocal information can be downloaded to the storage array via a digital communication link or by changing the storage array with one that is already loaded with data.

The vocal information system 835 can either be implemented within the cellular telephone 830, as shown in FIG. 27A, or it can be provided as an extension 840, as is known in the art and as shown in FIG. 27C. The extension 840 is connected to the cellular telephone via its standard extension connector.

Alternatively, the vocal information system 835 can be implemented by utilizing the existing processing elements in the regular cellular telephone, with expanded memory of at least several megabits of non-volatile memory, such as FLASH memory devices. The memory array 56 can be implemented as a removable module, such as described hereinabove.

It will be appreciated that the audio system of the present invention can be implemented into any system which produces an audio signal. Shown herein have been car radios, regular radios, portable radio systems, a portable computer and a cellular telephone. The audio system can alternatively be implemented in a compact disk unit (requiring the addition of a few control buttons), a standard telephone, etc.

Figure 28A:
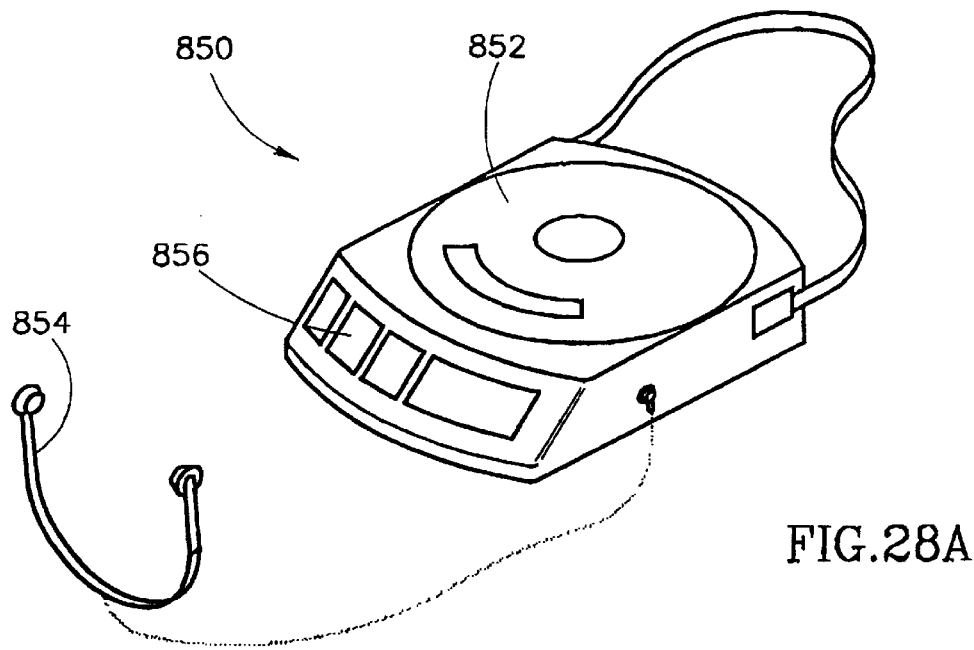
FIGS. 28A and 28B are illustrations of a compact disk player based embodiment.
Figure 28B:
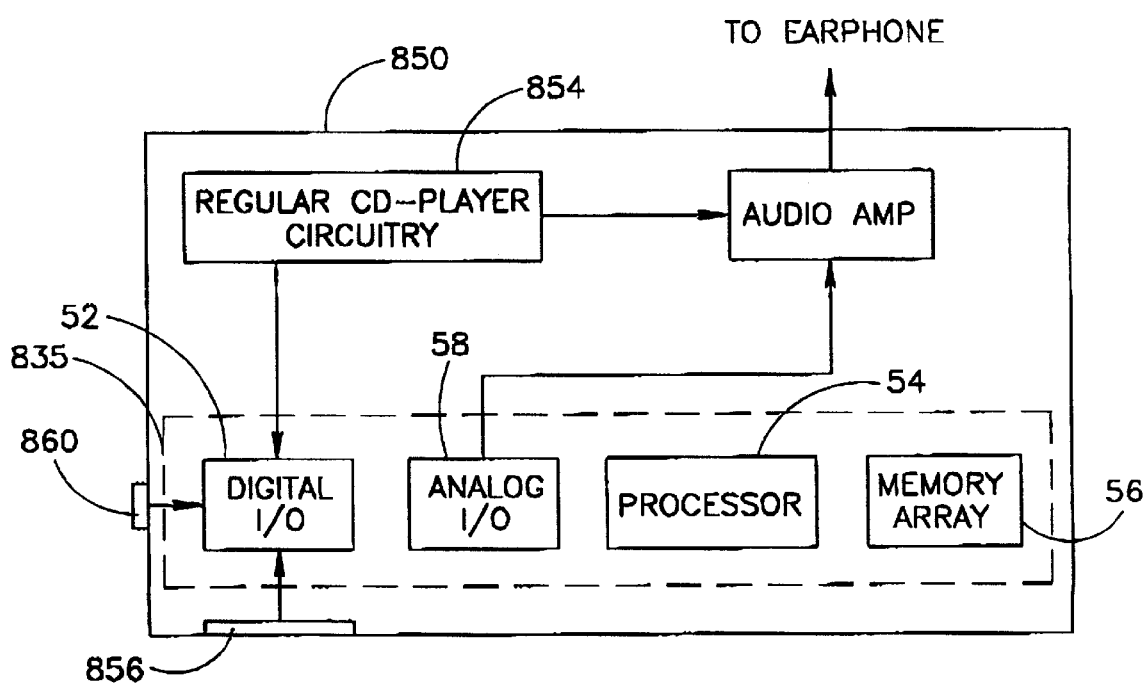

The compact disk unit embodiment is illustrated in FIGS. 28A and 28B. Similar elements have similar reference numerals. The compact disk player 850 includes a compact disk player 852, an earphone jack 854 and control keys 856. The block diagram of FIG. 28B is very similar to FIG. 27B of the cellular telephone 830, with the CD player circuitry 858 replacing that of the cellular telephone circuitry 834. In addition, the block diagram of FIG. 28B includes the control input 856, from the control keys, and an external digital connector 860 for downloading and uploading the data of the memory array 56.

It will be appreciated by persons skilled in the art that the present invention is not limited to what has been particularly shown and described hereinabove. Rather the scope of the present invention is defined by the claims which follow:

What is claimed is:

1. A cartridge for placing into a slot of an audio system, the cartridge comprising:

a housing whose shape generally matches said slot of an audio system and which has holes to receive the rotating elements of a magnetic tape deck;

a digital storage unit located within said housing which stores digital data therein; and electronic elements located within said housing and connected to said digital storage unit, wherein said electronic elements comprise;

at least one audio interface which communicates with said digital storage unit and which converts at least some of said digital data stored in said digital storage unit to analog audio signals to produce sound waves through said audio system, and at least one digital interface which communicates with said digital storage unit and with an external digital storage unit.

* * * * *

UNITED STATES PATENT AND TRADEMARK OFFICE
CERTIFICATE OF CORRECTION

PATENT NO. : 6,301,513 B1 Page 1 of 1
DATED : October 9, 2001
INVENTOR(S) : Avner Divon et al.

It is certified that error appears in the above-identified patent and that said Letters Patent is hereby corrected as shown below:

<u>Title page,</u>
Item [75] Inventor, change "AYNER DIVON" to -- AVNER DIVON --.

Signed and Sealed this

Twelfth Day of March, 2002

Attest:

Attesting Officer

JAMES E. ROGAN
Director of the United States Patent and Trademark Office